United States Patent
Suzuki et al.

[11] Patent Number: 6,115,095
[45] Date of Patent: Sep. 5, 2000

[54] IN-PLANE SWITCHING TYPE LIQUID CRYSTAL DISPLAY HAVING A COMPENSATION LAYER WITH THE PRINCIPAL OPTICAL AXIS EXTENDING PERPENDICULARLY TO THE SUBSTRATE

[75] Inventors: Teruaki Suzuki; Masayoshi Suzuki; Shinichi Nishida, all of Tokyo, Japan

[73] Assignee: NEC Corporation, Tokyo, Japan

[21] Appl. No.: 09/177,970

[22] Filed: Oct. 26, 1998

[30] Foreign Application Priority Data

Oct. 24, 1997 [JP] Japan .................................. 9-292856

[51] Int. Cl.⁷ ...................... G02F 1/1343; G02F 1/1335
[52] U.S. Cl. ........................ 349/141; 349/117; 349/118; 349/119
[58] Field of Search ................... 349/117, 118, 349/119, 143, 141

[56] References Cited

U.S. PATENT DOCUMENTS

| | | | |
|---|---|---|---|
| 4,653,875 | 3/1987 | Hines | 350/442 |
| 5,196,953 | 3/1993 | Yeh et al. | 359/73 |
| 5,585,950 | 12/1996 | Nishino et al. | 349/118 |
| 5,600,464 | 2/1997 | Ohe et al. | 349/123 |
| 5,619,352 | 4/1997 | Koch et al. | 349/117 |
| 5,650,833 | 7/1997 | Akatsuka et al. | 349/118 |
| 5,721,600 | 2/1998 | Sumiyoshi et al. | 349/119 |
| 5,739,881 | 4/1998 | Xu et al. | 349/118 |
| 5,757,455 | 5/1998 | Sugiyama et al. | 349/118 |
| 5,838,415 | 11/1998 | Hayashi et al. | 349/161 |
| 5,841,499 | 11/1998 | Baur et al. | 349/141 |
| 5,854,665 | 12/1998 | Iba | 349/119 |
| 5,859,681 | 1/1999 | Vander-ploeg et al. | 349/120 |

FOREIGN PATENT DOCUMENTS

| | | |
|---|---|---|
| HO4-258923 | of 1992 | Japan . |
| HO5-505247 | of 1993 | Japan . |
| 5-257138 | 10/1993 | Japan . |
| HO6-167706 | of 1994 | Japan . |
| 6-11714 | 1/1994 | Japan . |
| 7-13022 | 1/1995 | Japan . |
| 9-33906 | 2/1997 | Japan . |

*Primary Examiner*—William L. Sikes
*Assistant Examiner*—Tarifur R. Chowdhury
*Attorney, Agent, or Firm*—Sughrue, Mion, Zinn, Macpeak & Seas, PLLC

[57] ABSTRACT

There is provided an in-plane switching type liquid crystal display including (a) first and second polarizing plates facing each other and spaced away from each other, (b) a liquid crystal layer situated between the first and second polarizing plates, orientation azimuth of the liquid crystal layer being caused to vary by an electric field parallel to a substrate, (c) a first compensation layer situated between the first and second polarizing plates, the first compensation layer having positive uniaxial, optical anisotropy, and having an optical axis extending perpendicularly to the substrate, the first compensation layer varying birefringence thereof to thereby compensate for fluctuation in birefringence of the liquid crystal layer, caused by variation of a viewing angle, and (d) a second compensation layer situated between the first and second polarizing plates, the second compensation layer having positive uniaxial, optical anisotropy, and having an optical axis extending in parallel with the substrate and perpendicularly to initial orientation of the liquid crystal layer. Since a variation in birefringence of the first compensation layer cancels a variation in birefringence of the liquid crystal layer, the in-plane switching type liquid crystal display provides qualified images with less color caused by a change in a viewing angle.

19 Claims, 21 Drawing Sheets

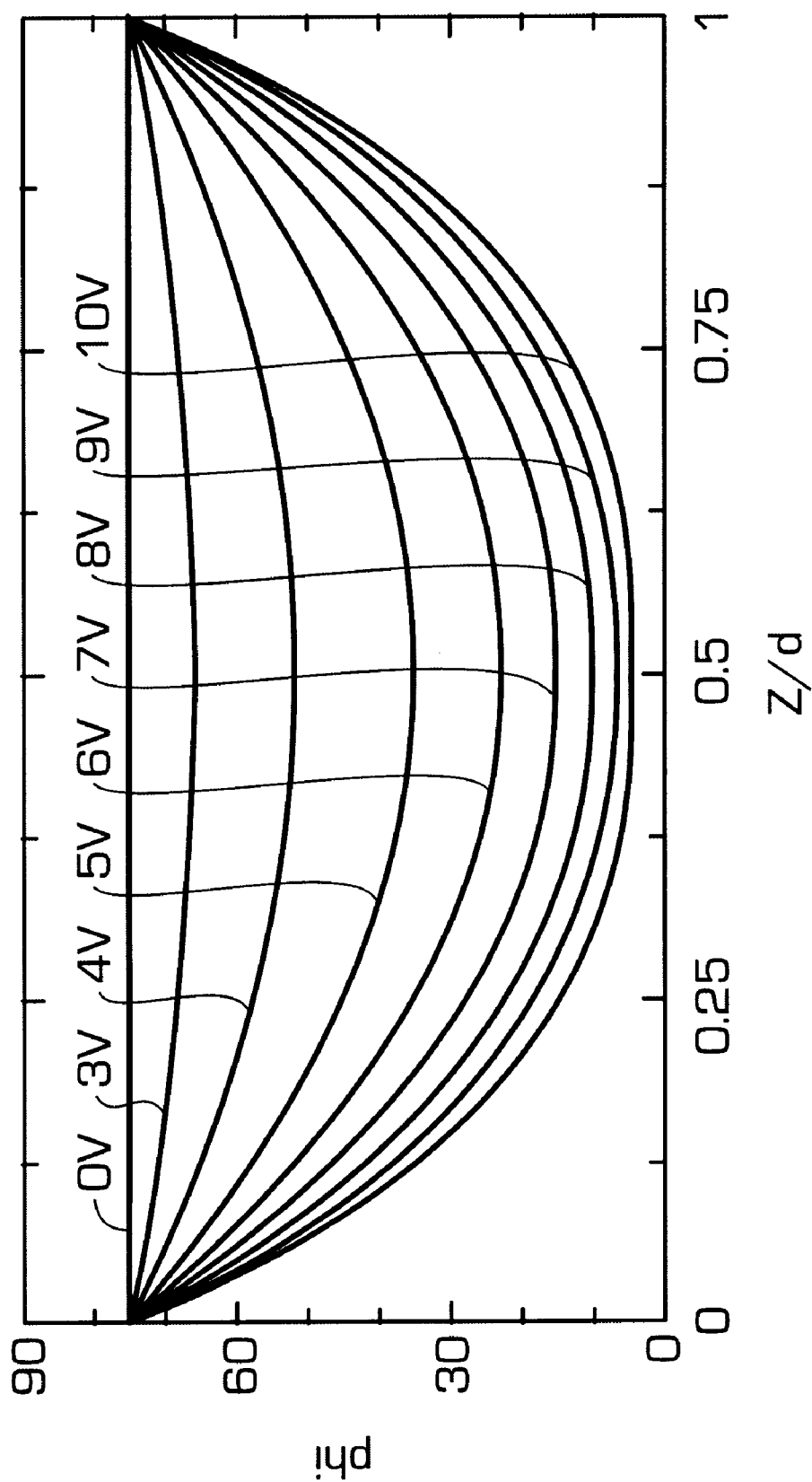

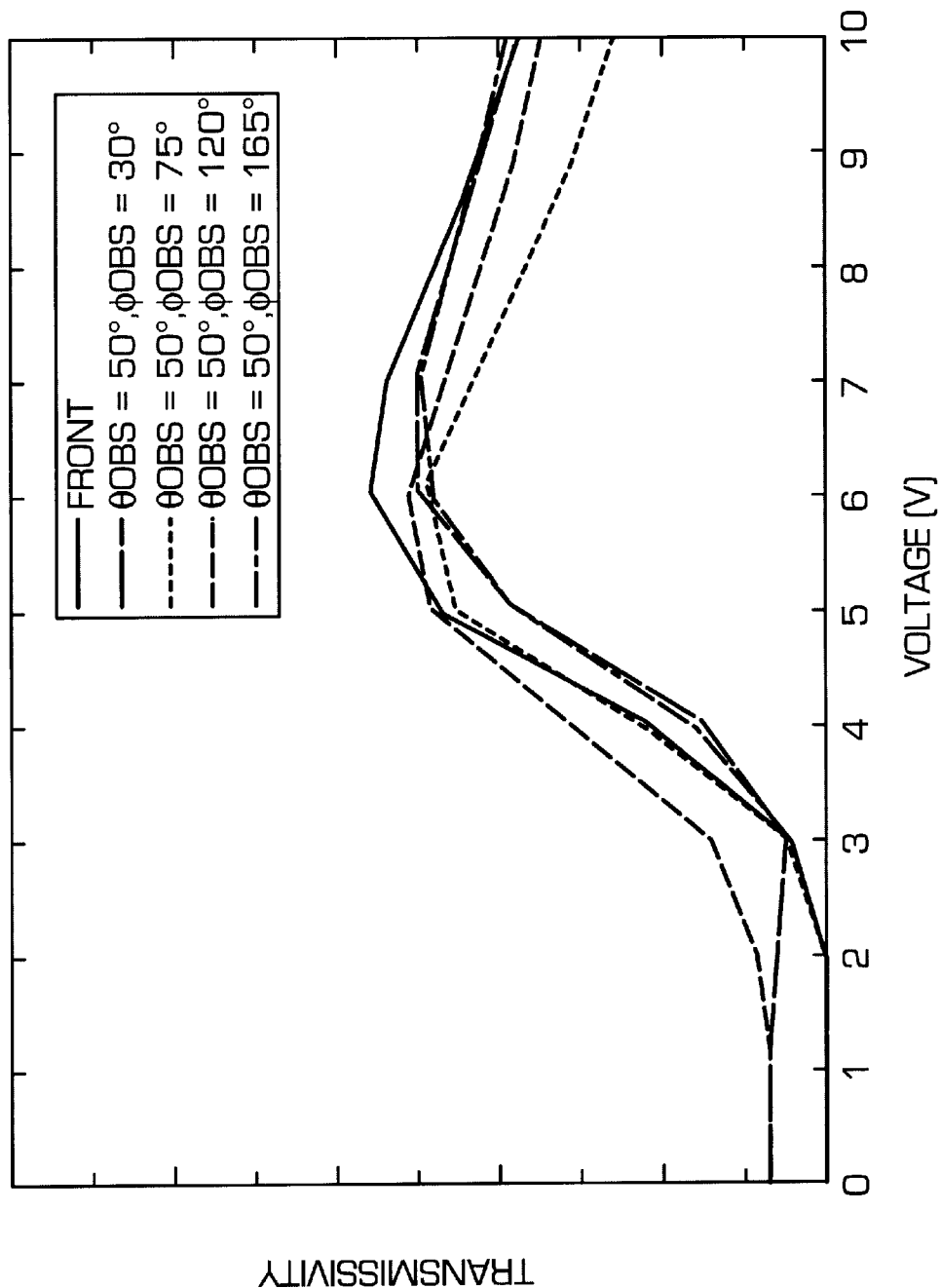

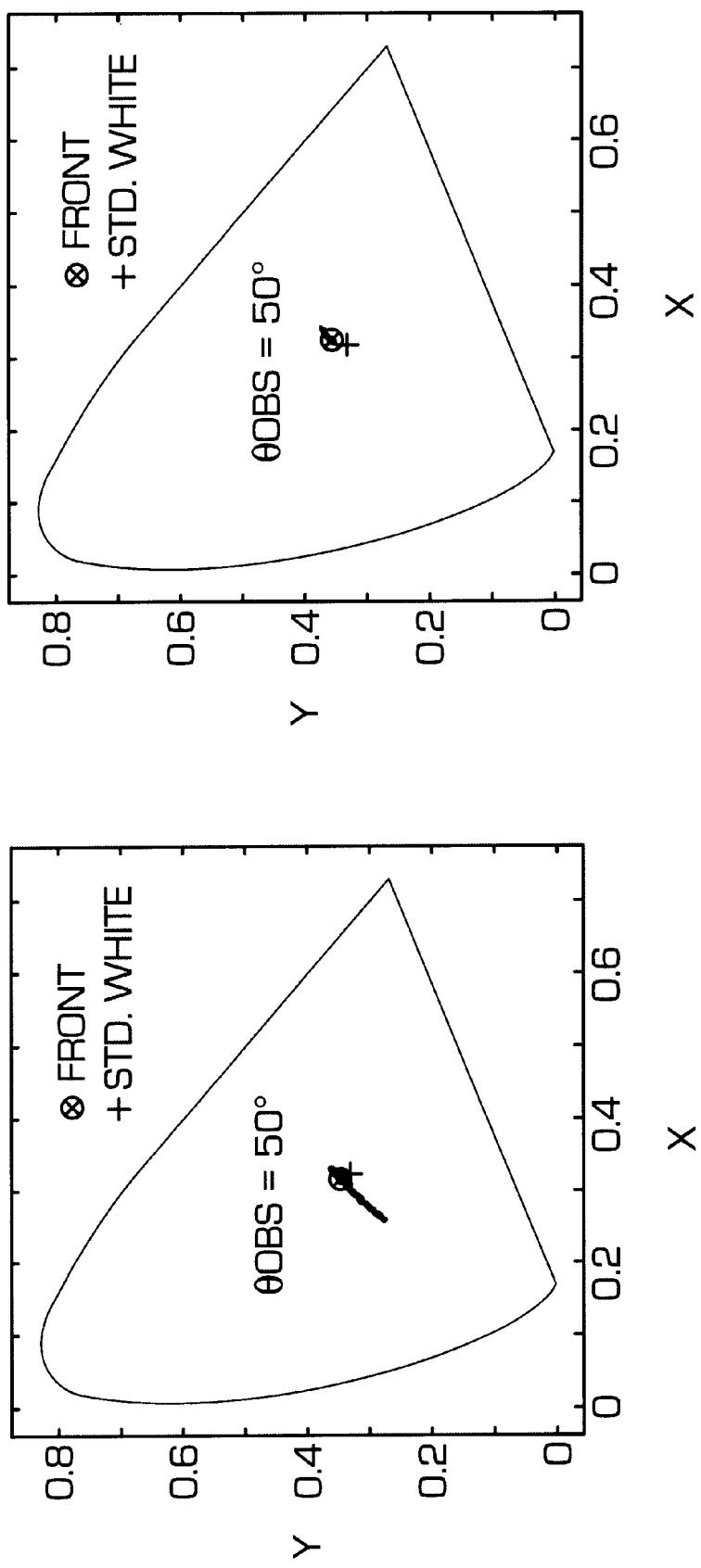

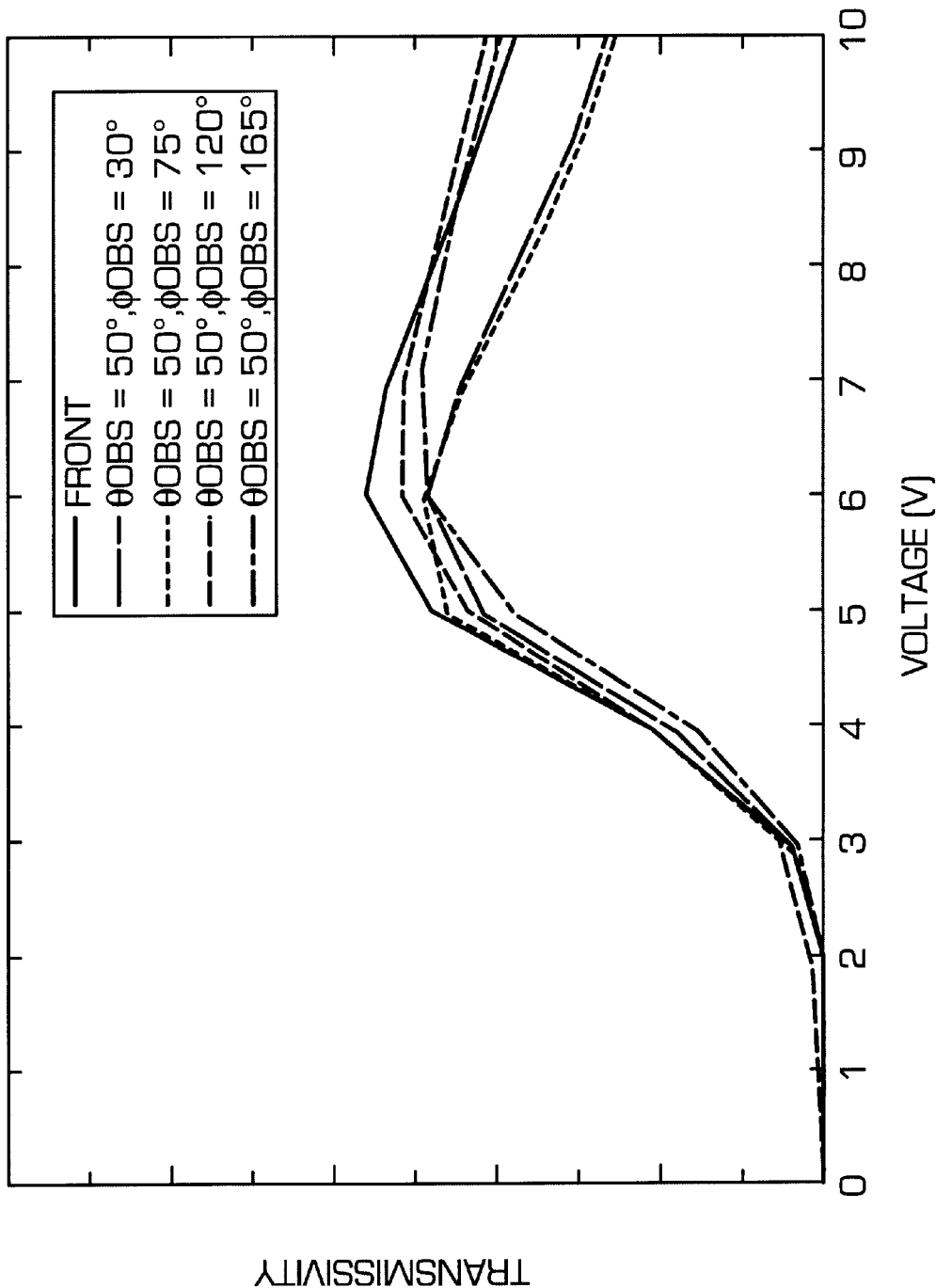

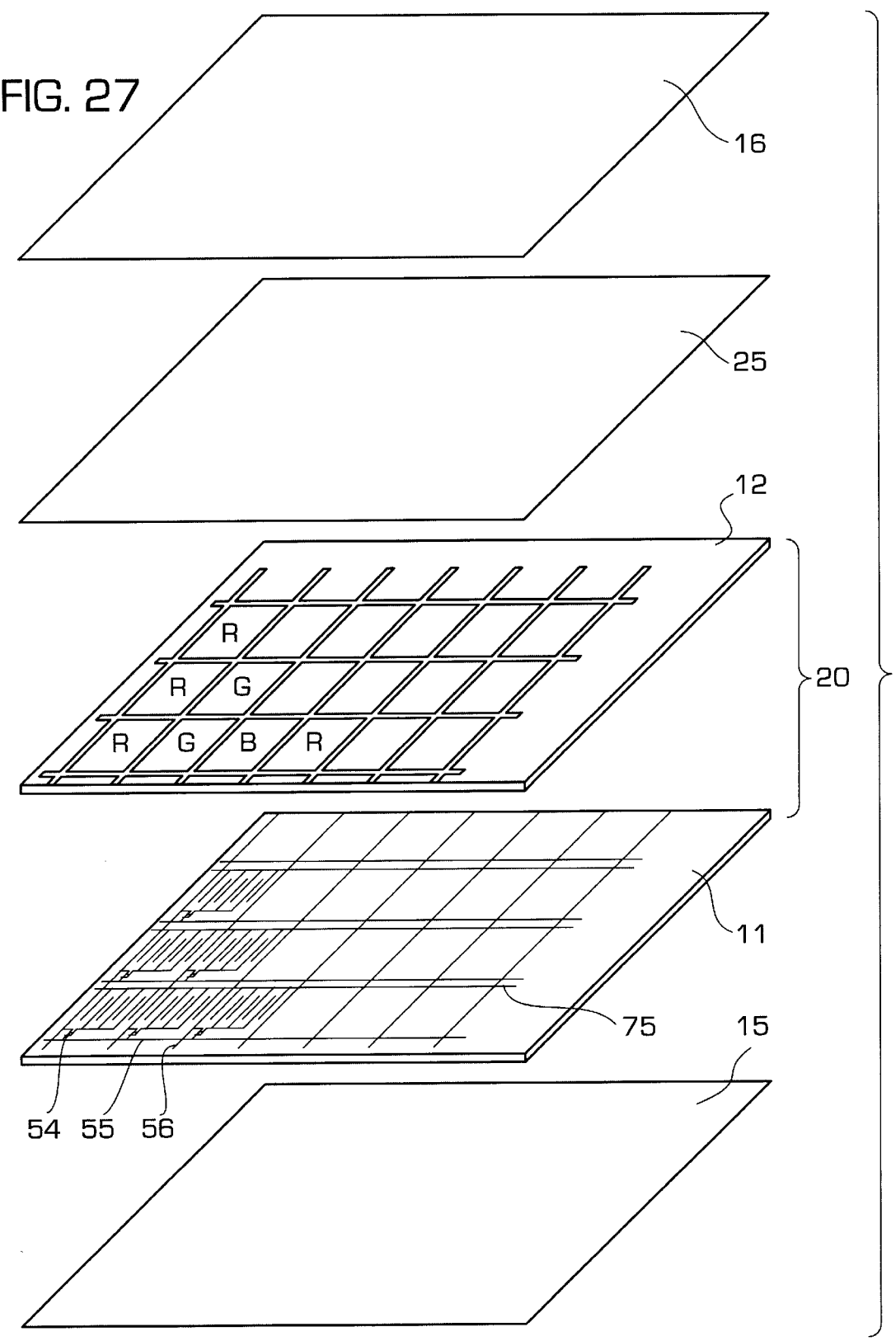

IN-PLANE SWITCHING TYPE LIQUID CRYSTAL DISPLAY HAVING A COMPENSATION LAYER WITH THE PRINCIPAL OPTICAL AXIS EXTENDING PERPENDICULARLY TO THE SUBSTRATE

BACKGROUND OF THE INVENTION

1. Field of the Invention

The invention relates to a liquid crystal display (LCD), and more particularly to an in-plane switching (IPS) type active matrix liquid crystal display.

2. Description of the Related Art

In general, a liquid crystal display is characterized by a thinner body, a lighter weight, and smaller powers consumption. In particular, an active matrix liquid crystal display (AM-LCD) where pixels arranged in a matrix are actuated by an active device is now expected as a flat panel display providing qualified images. Among active matrix liquid crystal displays, a thin film transistor type liquid crystal display (TFT-LCD) draws attention which employs a thin film transistor (TFT) as an active device for switching individual pixels.

A conventional active matrix liquid crystal display makes use of twisted nematic (TN) type electro-optical effect. That is, a conventional active matrix liquid crystal display applies an electric field almost perpendicular to substrates to liquid crystal sandwiched between the substrates, to thereby actuate liquid crystal.

An in-plane switching type liquid crystal display where liquid crystal is actuated by an electric field almost parallel to substrates has been suggested in U.S. Pat. No. 3,807,831. The suggested liquid crystal display employs an electrode including a plurality of sinking combs which are in mesh each other.

Japanese Patent Publication No. 63-21907 has suggested an active matrix liquid crystal display making use of twisted nematic electro-optical effect, which includes an electrode including a plurality of sinking combs in mesh each other for lowering a parasitic capacitor formed between a common electrode and a drain bus line, or a parasitic capacitor formed between a common electrode and a gate bus line.

FIG. 1 illustrates an above-mentioned conventional in-plane switching type liquid crystal display, which is comprised of a pair of glass substrates 11 and 12, a liquid crystal layer 20 sandwiched between the glass substrates 11 and 12, comb electrodes 70 formed on the glass substrate 11 and having sinking combs in mesh with each other, and a pair of polarizing plates (not illustrated) each positioned outside the glass substrate 11 or 12.

By applying a voltage across the comb electrodes 70, there is generated a liquid crystal driving electric field E1 parallel to surfaces of the glass substrates 11 and 12, and perpendicular to a direction in which sinking combs of the electrodes 70 extend. The thus generated electric field E1 changes orientation azimuth of liquid crystal molecules 21. Hence, it is possible to control transmissivity of optical beams by varying a voltage to be applied across the comb electrodes 70.

In such an in-plane switching type liquid crystal display as illustrated in FIG. 1, it is necessary to cause the liquid crystal molecules 21 to rotate only in a direction, when a voltage is applied thereto, in order to enable stable and uniform display. To this end, the liquid crystal molecules 21 are arranged to have initial orientation azimuth slightly deviating from a direction perpendicular to a direction of the liquid crystal driving electric field E1. In other words, now suppose that liquid crystal has initial orientation azimuth $\phi LC0$ to be measured on the basis of a direction perpendicular to a direction in which parallel electrode pairs comprised of sinking combs of the electrodes 70 extend, the orientation of the liquid crystal molecules 21 is arranged so that the initial orientation azimuth $\phi LC0$ is smaller than 90 degrees ($\phi LC0 < 90°$). Hereinbelow, in this specification, a direction of an electric field and orientation azimuth of liquid crystal are measured on the basis of a direction perpendicular to a direction in which parallel electrode pairs comprised of sinking combs of the electrodes 70 extend ($\phi = 0$). A counterclockwise direction is defined as positive.

As mentioned later, it is necessary in the in-plane switching type liquid crystal display illustrated in FIG. 1 to rotate the liquid crystal molecules 21 by 45 degrees relative to initial orientation azimuth thereof in order to accomplish adequate display contrast. To this end, it is preferable to arrange the liquid crystal molecules 21 to have orientation so that the initial orientation azimuth $\phi$ LC0 is equal to or greater than 45 degrees, but smaller than 90 degrees ($45° \leq \phi$ LC0 < 90°).

In the liquid crystal display illustrated in FIG. 1, since the initial orientation azimuth of liquid crystal slightly deviates in a clockwise direction from a direction in which the parallel electrode pairs extend, when viewed from above the glass substrate 12, the liquid crystal molecules rotate in a direction shown with an arrow A, when a voltage is applied across the electrodes 70.

In the liquid crystal display illustrated in FIG. 1, optical transmissivity T is expressed with the following equation (1), if polarizing plates (not illustrated) are designed to have polarizing transmissive axes (namely, polarizing directions) perpendicular with each other.

$$T = (\sin 2A \times \sin 2B)/2$$
$$A = 2(\phi P - \phi LC), \quad B = \pi \Delta n \, d/\lambda \tag{1}$$

In the equation (1), $\phi LC$ indicates orientation azimuth of the liquid crystal molecules 21 when a voltage is applied across the electrodes 70, $\phi P$ indicates azimuth of a transmissive axis of a polarizing plate through which optical beams are introduced, $\Delta n$ indicates index anisotropy of liquid crystal, "d" is a thickness of a cell, namely, a thickness of the liquid crystal layer 20, and $\lambda$ indicates a wavelength of optical beams.

Azimuth $\phi A$ of a transmissive axis of a polarizing plate through which optical beams leave is expressed as $\phi A = \phi P + 90°$, or $\phi A = \phi P - 90°$. In accordance with the above-mentioned equation (1), the orientation azimuth ($\phi$ LC) of liquid crystal is varied by the liquid crystal driving electric field E1 parallel to the substrates 11 and 12, to thereby control the transmissivity of optical beams.

If one of the polarizing plates is designed to have a transmissive axis having a direction coincident with initial orientation azimuth of liquid crystal ($\phi$ LC0 = $\phi P$ or $\phi LC0 = \phi A$), dark state is generated when no voltage is applied across the comb electrodes 70, whereas the transmissivity is maximized when the orientation azimuth of liquid crystal is varied by 45 degrees by the liquid crystal driving electric field E1, and resultingly, bright state is generated. As an alternative, dark state can be generated when a voltage is applied across the comb electrodes 70, by differently arranging the polarizing plates.

In the explanation made so far, it was supposed for the purpose of simplifying the explanation that the liquid crystal molecules 21 in the liquid crystal layer 20 sandwiched between the glass substrates 11 and 12 rotate in a uniform fashion. However, liquid crystal molecules existing on interfacial surfaces of the glass substrates 11 and 12 are relatively strongly bonded to the substrates 11 and 12, and as a result, azimuth of such liquid crystal molecules remains almost unchanged.

In a display mode in which the above-mentioned birefringence effect is utilized, it is understood in view of the above-mentioned equation (1) that a light having a wavelength which meets the equation, $\Delta n\, d=\lambda/2$, can pass through the polarizing plate with highest efficiency. Hence, in order to accomplish multicolor display by using white-color display or a color filter, it would be necessary to arrange index anisotropy and a thickness of a liquid crystal layer so that transmissive spectrum has a principal wavelength of about 550 nm, that is, $\Delta n\, d$ is equal to 275 nm ($\Delta n\, d=550/2=275$ nm). However, for such reasons as mentioned above, it is actually preferable to arrange $\Delta n\, d$ to have a slightly greater value than the above-mentioned one, namely, arrange $\Delta n\, d$ to have a value in the range of about 280 nm to about 330 nm.

Japanese Unexamined Patent Publication No. 5-505247 (International Publication No. WO91/10936) has suggested an improvement of viewing angle characteristic which is one of shortcomings of the above-mentioned in-plane switching type TN liquid crystal display. In these days, this superior viewing angle characteristic draws attention, and hence, an in-plane switching type active matrix liquid crystal display is applied to a large-sized monitor screen.

FIG. 2 illustrates a curve showing voltage-transmissivity characteristic in an in-plane switching type liquid crystal display. Herein, the voltage-transmissivity characteristic means how a relation between a voltage and transmissivity varies in dependence on an angle with which the liquid crystal display is viewed. An angle with which the liquid crystal display is viewed is defined with $\phi obs$ and $\theta obs$ where $\phi obs$ indicates an azimuth angle measured from a direction perpendicular to a direction in which an electrode extends, and $\theta obs$ is an inclination angle measured from a direction perpendicular to a substrate.

The liquid crystal cell used for the measurement was designed to have $\phi LC0$ of 85 degrees, $\phi P$ of 85 degrees, and $\phi A$ of −5 degrees. The electrode had combs in mesh with each other, where each of the combs had a width of 5 $\mu$m, and the combs were spaced away from each other by 15 $\mu$m. The used liquid crystal material has index anisotropy of 0.067, and the cell had a thickness of 4.9 $\mu$m.

As is understood in view of FIG. 2, fluctuation in a voltage-transmissivity characteristic caused by variation in a viewing angle is small in an in-plane switching type liquid crystal display, which means that an in-plane switching type liquid crystal display has superior viewing angle characteristic.

However, the above-mentioned in-plane switching type liquid crystal display has a problem that displayed images are unpreferably tinged with blue or red in certain viewing angles.

FIG. 3 illustrates how transmissive spectrum varies in bright state in dependence on viewing angles. A sample of the liquid crystal cell used for the measurement is the same as the liquid crystal cell used for the measurement of FIG. 2. In this liquid crystal cell, orientation azimuth of liquid crystal molecules varies by about 45 degrees, specifically, from initial orientation azimuth $\phi LC0=85$ degrees where a voltage is not applied, to orientation azimuth $\phi LC$ in bright state where a voltage is applied. Accordingly, the orientation azimuth $\phi LC$ is equal to 40 degrees (85−45=40). As illustrated in FIG. 3, the liquid crystal cell in bright state has a tendency that a peak of transmissive spectrum deviates towards a shorter wavelength at $\phi obs=40$ degrees, and resultingly, displayed images are tinged with blue.

On the other hand, a peak of transmissive spectrum deviates towards a longer wavelength at $\phi obs=−50$ degrees, and resultingly, displayed images are tinged with red. The same tendency was observed at azimuth different by 180 degrees in a clockwise or counterclockwise direction.

FIGS. 4A and 4B illustrate loci of varying chromaticity, measured from transmissive spectrum obtained when a polar angle of an observation direction is fixed at 50 degrees, and an azimuth angle of an observation direction is varied from 0 to 360 degrees. FIG. 4A illustrates varied chromaticity in a state intermediate between dark and bright states, and FIG. 4B illustrates varied chromaticity in bright state.

As mentioned so far, an in-plane switching type liquid crystal display is superior to a conventional vertical field type or twisted nematic type liquid crystal display with respect to display contrast, gradation inversion, and so on. However, the above-mentioned problem that displayed images are tinged with blue or red in certain viewing angles remains unsolved.

In the above-mentioned liquid crystal cell, liquid crystal molecules are oriented at initial orientation azimuth $\phi LC0=85$ degrees when a voltage is not applied across electrodes. When a voltage is applied across the electrodes to thereby generate bright state, the orientation azimuth $\phi LC$ of liquid crystal molecules varies by about 45 degrees from the initial orientation azimuth $\phi LC0$. Hence, the orientation azimuth $\phi LC$ becomes equal to 40 degrees (85−45=40).

In FIG. 2, azimuth at which displayed images are tinged with blue corresponds to the orientation azimuth $\phi LC$ of 40 degrees, and azimuth at which displayed images are tinged with red is perpendicular to the orientation azimuth $\phi LC$ of 40 degrees. As mentioned earlier, the transmissive spectrum of the abovementioned liquid crystal cell is dependent on birefringence ($\Delta n\, d$) of a liquid crystal layer. The fact that displayed images are tinged with blue or red in certain viewing angles is based on dependency of apparent birefringence of a liquid crystal layer on a viewing angle. This is explained in detail hereinbelow.

Effective index anisotropy $\Delta N$ obtained when a light obliquely enters the above-mentioned cell is defined with the following equation (2).

$$\Delta N = ne\, no/C^{1/2} - no$$

$$C = ne^2 \cos^2 \theta_2 + no^2 \sin^2 \theta_2 \qquad (2)$$

In the equation (2), $\theta_2$ indicates an angle formed between a direction in which a light is transmitted and a major axis of liquid crystal molecules, no indicates an index of refraction with respect to ordinary ray, which is a ray oscillating or polarizing in a direction perpendicular to an optical axis of crystal, namely, a direction perpendicular to a direction of a major axis of liquid crystal molecules, and ne indicates an index of refraction with respect to abnormal ray which is a ray oscillating or polarizing in parallel with the above-mentioned optical axis.

Since the angle $\theta_2$ is equal to 90 degrees in perpendicular incidence, the index anisotropy $\Delta N$ is given as $\Delta N=\Delta n=ne−no$. On the other hand, in a direction where displayed images are tinged with blue, since a viewing angle is inclined towards a major axis of liquid crystal molecules, the angle $\theta_2$ is smaller than 90 degrees ($\theta_2<90°$), and hence, the index anisotropy $\Delta N$ becomes smaller. In a direction where displayed images are tinged with red, since a viewing angle is inclined towards a minor axis of liquid crystal molecules, the angle $\theta_2$ remains 90 degrees ($\theta_2=90°$), and hence, $\Delta N$ remains equal to $\Delta n$ ($\Delta N=\Delta n$). FIGS. 5A and 5B illustrate how index anisotropy varies in dependence on a viewing angle.

Since a substantial thickness D of a liquid crystal layer is defined as $D=d/\cos(\theta obs)$ in oblique incidence, the substantial thickness D of a liquid crystal layer becomes greater regardless of a direction to which a viewing angle is inclined.

As both the index anisotropy $\Delta n$ and the thickness "d" of a liquid crystal layer vary, a birefringence ($\Delta n$ d) varies, which in turn varies color with which displayed images are tinged in dependence on viewing angles.

The explanation made so far can be summarized as follows.

A direction where displayed images are tinged with blue is identical with a direction of a major axis of liquid crystal molecules in bright state, in which case, the index anisotropy $\Delta n$ is reduced, and the thickness "d" of a liquid crystal layer is increased. However, since the degree of reduction in the index anisotropy $\Delta n$ is greater than the degree of increase in the thickness "d", the birefringence ($\Delta n$ d) is reduced.

On the other hand, a direction where displayed images are tinged with red is identical with a direction of a minor axis of liquid crystal molecules in bright state, in which case, the index anisotropy $\Delta n$ remains unchanged, and the thickness "d" of a liquid crystal layer is increased. Eventually, the birefringence ($\Delta n$ d) is increased.

FIG. 6 illustrates calculation results about how an apparent birefringence ($\Delta n$ d) is varied as a viewing angle varies. An axis of ordinate in FIG. 6 indicates $\Delta n$ d×2, which corresponds to a principal wavelength of spectrum of transmissive lights. The index anisotropy $\Delta n$ and the thickness "d" of a liquid crystal layer both used for calculation were arranged so that a value of $\Delta n$ d×2 is equal to 550 nm, when viewed from a front. The calculation was made on the assumption that liquid crystal sandwiched between upper and lower substrates uniformly rotate.

It is understood in view of FIG. 6 that an apparent birefringence becomes smaller if a viewing angle is inclined towards a major axis of liquid crystal molecules, and as a result, a principal wavelength of transmissive light spectrum deviates towards a shorter wavelength, and hence, displayed images are tinged with blue, whereas an apparent birefringence becomes greater if a viewing angle is inclined towards a minor axis of liquid crystal molecules, and as a result, a principal wavelength of transmissive light spectrum deviates towards a longer wavelength, and hence, displayed images are tinged with red.

Japanese Unexamined Patent Publication No. 9-80424 has suggested the use of birefringence medium for compensating for variation of birefringence in a liquid crystal layer, as a solution to the above-mentioned problem in an in-plane switching type liquid crystal display that displayed images are tinged with colors. FIG. 7 is an exploded perspective view illustrating the liquid crystal display suggested in the above-mentioned Publication. The illustrated liquid crystal display is comprised of a first compensation layer 25, a second compensation layer 26, and a liquid crystal layer 20, all of which are sandwiched between first and second polarizing plates 15 and 16. The first and second polarizing plates 15 and 16 are made of birefringence material. According to the Publication, optical axes of the birefringence mediums 25 and 26 are intersected at a front so that a phase difference between them is cancelled, and that variation in birefringence obtained when the birefringence mediums 25 and 26 are inclined is different from each other. As a result, the variation in birefringence obtained when the liquid crystal layer 20 is inclined can be compensated for.

However, it has been confirmed according to the optical simulation carried out by the inventors that the liquid crystal display suggested in the above-mentioned Publication did not have so superior viewing angle characteristic. FIG. 8 illustrates a volume-transmissivity characteristic of the suggested liquid crystal display, and FIGS. 9A and 9B illustrate loci of chromaticity change in the suggested liquid crystal display.

The first compensation layer 25 is composed of birefringence medium, and has the following indices of refraction.

$$ns=1.5850, nf=1.5800, nz=1.580$$

The second compensation layer 26 is composed of birefringence medium, and has the following indices of refraction.

$$ns=1.5845, nf=1.5820, nz=1.5810$$

Herein, ns and nf indicate indices of refraction associated with two optical axes parallel to a substrate, and nz indicates an index of refraction associated with an optical axis extending in a direction perpendicular to a substrate, namely, a thickness-wise direction of the first and second compensation layers 25 and 26. The first compensation layer 25 has a thickness of 100 $\mu$m, and the second compensation layer 26 has a thickness of 200 $\mu$m. The first compensation layer 25 is arranged in such a manner that a principal optical axis associated with the index of refraction ns is coincident with an optical axis of liquid crystal in bright state, and the second compensation layer 26 is arranged in such a manner that a principal optical axis associated with the index of refraction ns is perpendicular to an optical axis of liquid crystal in bright.

As is obvious in light of FIGS. 8, 9A and 9B, in the liquid crystal display suggested in the above-mentioned Japanese Unexamined Patent Publication No. 9-80424, displayed images are not released from being tinged with colors when viewing angles vary, but are tinged with colors to a greater degree.

In addition, as to the voltage-transmissivity characteristic, it was found that there occurred an inversion in gradation. That is, fluctuation in chromaticity caused by variation in a viewing angle leaves a big locus. In the voltage-transmissivity characteristic, the transmissivity increases at a front as a voltage increases, whereas the transmissivity decreases as a voltage increases in azimuth of an optical axis of the first or second compensation layer 25 or 26.

Japanese Unexamined Patent Publication No. 6-11714 has suggested a liquid crystal display capable of solving problems that displayed images are inverted in certain viewing angles, images cannot be seen at all, or displayed images are tinged with colors in a simple or active matrix liquid crystal display.

The suggested liquid crystal display includes a driving liquid crystal cell situated between a pair of polarizing plates, and having liquid crystal having orientation which is twisted when a voltage is not applied, and further includes an optical anisotropic device having an optical axis successively twisted. The optical anisotropic device has an optical axis of a surface through which a light enters, inclined by a certain angle relative to an absorptive or transmissive axis of a polarizing plate through which a light leaves.

However, according to the experiments the inventors had conducted, the suggested liquid crystal display cannot solve a problem that displayed images are tinged with colors in certain viewing angles.

Japanese Unexamined Patent Publications Nos. 2-285303, 4-16916, 432818, 5-27235, and 5-297223 have suggested STN liquid crystal display including an optical compensation layer wherein an index of refraction in a thickness-wise direction is greater than an index of refraction of at least one direction in a plane, to thereby improve a viewing angle characteristic. However, the viewing angle characteristic is not improved sufficiently to solve the problems of inversion of images and colored images.

Japanese Unexamined Patent Publication No. 6-11714 has also suggested a liquid crystal display including a driving liquid crystal cell situated between a pair of polarizing plates, and having liquid crystal having orientation which is twisted when a voltage is not applied, and further including an optical anisotropic device having an optical axis successively twisted. The optical anisotropic device has an optical axis of a surface through which a light enters, inclined by an angle $\phi$ (relative to an absorptive axis of a polarizing plate through which a light leaves. The angle $\phi$ is defined as follows.

$$\phi = \Delta n^2 \times p \times d \times 180° / 4\lambda^2$$

In the equation, $\Delta n$ indicates optical anisotropy of the optical anisotropic device, "p" indicates a twisted pitch length of an optical axis of the optical anisotropic device, "d" indicates a thickness of the optical anisotropic device, and $\lambda$ indicates a wavelength of visible lights.

However, the suggested liquid crystal display cannot improve a viewing angle characteristic sufficiently to solve the problems of inversion of images and colored images.

SUMMARY OF THE INVENTION

In view of the foregoing problems, it is an object of the present invention to provide an in-plane switching type liquid crystal display capable of presenting images less tinged with colors regardless of variation in a viewing angle.

As mentioned above, the conventional in-plane switching type liquid crystal display cannot solve the problem that displayed images are tinged with colors in certain viewing angles. Based on a lot of experiments and studies, the inventors present a liquid crystal display capable of solving the problem, as follows.

There is provided an in-plane switching type liquid crystal display including (a) first and second polarizing plates facing each other and spaced away from each other, (b) a liquid crystal layer situated between the first and second polarizing plates, orientation azimuth of the liquid crystal layer being caused to vary by an electric field parallel to a substrate, and (c) a first compensation layer situated between the first and second polarizing plates, the first compensation layer having positive uniaxial, optical anisotropy, and having an optical axis extending perpendicularly to the substrate, the first compensation layer varying birefringence thereof to thereby compensate for fluctuation in birefringence of the liquid crystal layer, caused by variation of a viewing angle.

In accordance with the above-mentioned liquid crystal display, birefringence of the first compensation layer having positive index anisotropy and optical anisotropic axis perpendicular to a substrate is equal to zero at perpendicular incidence, but varies with an angle with which a light enters so as to cancel variation in birefringence of the liquid crystal layer. As a result, it is possible to prevent displayed images from being tinged with colors in certain viewing angles.

There is further provided an in-plane switching type liquid crystal display including (a) first and second polarizing plates facing each other and spaced away from each other, (b) a liquid crystal layer situated between the first and second polarizing plates, orientation azimuth of the liquid crystal layer being caused to vary by an electric field parallel to a substrate, (c) a first compensation layer situated between the first and second polarizing plates, the first compensation layer having positive uniaxial, optical anisotropy, and having an optical axis extending perpendicularly to the substrate, the first compensation layer varying birefringence thereof to thereby compensate for fluctuation in birefringence of the liquid crystal layer, caused by variation of a viewing angle, and (d) a second compensation layer situated between the first and second polarizing plates, the second compensation layer having positive uniaxial, optical anisotropy, and having an optical axis extending in parallel with the substrate and perpendicularly to initial orientation of the liquid crystal layer.

In accordance with the above-mentioned liquid crystal display, it is possible to prevent displayed images from being tinged with colors in certain viewing angles. In addition, it is also possible to prevent occurrence of light-loosening in oblique viewing angle, even when black color is to be displayed, which in turn prevents problems of degradation of contrast and inversion of gradation.

It is preferable that a product $\Delta nF2 \times dF2$ of index anisotropy $\Delta nF2$ ($\Delta nF2 = nzF2 - nxF2$, $nyF2$) and a thickness DF2 of the second compensation layer is equal to about a quarter of a product $\Delta n \times d$ of index anisotropy $\Delta n$ and a thickness D of the liquid crystal layer.

In accordance with the above-mentioned preferred embodiment, the advantageous effects obtained by the second compensation layer, that is, prevention of images from being colored and prevention of light-loosening in oblique viewing angles when black is displayed, are enhanced.

The first and second compensation layers may be positioned adjacent to each other. It is not always necessary to position the first and second compensation layers adjacent to each other. The first and second compensation layers may be spaced away from each other. For instance, the first and second compensation layers may be positioned at opposite sides of the liquid crystal layer.

The second compensation layer may be comprised of a plurality of divisional layers situated between the first and second polarizing plates.

It is preferable that a product $\Delta nF1 \times dF1$ of index anisotropy $\Delta nF1$ ($\Delta nF1 = nzF1 - nxF1$, $nyF1$) and a thickness dF1 of the first compensation layer is equal to about a half of a product $\Delta n \times d$ of index anisotropy $\Delta n$ and a thickness d of the liquid crystal layer.

According to the above-mentioned preferred embodiment, an increase (or a decrease) of birefringence in the liquid crystal layer is coincident with a decrease (or an increase) of birefringence in the first compensation layer, resulting in that optical compensation effect can be obtained with high efficiency.

The first compensation layer may be comprised of two divisional layers each positioned at either side of the liquid crystal layer.

It is preferable that at least one of the first and second compensation layers is composed of a single film, or of a plurality of stacked films.

It is preferable that at least one of the first and second compensation layers is formed integral with one of the first and second polarizing plates.

It is preferable that a product Δn×d of index anisotropy Δn and a thickness d of the liquid crystal layer, a product ΔnF1×dF1 of index anisotropy ΔnF1 and a thickness dF1 of the first compensation layer, and a product ΔnF2×dF2 of index anisotropy ΔnF2 and a thickness dF2 of the second compensation layer are determined so as to satisfy the following equation (A).

$$\Delta n \times d : \Delta nF1 \times dF1 : \Delta nF2 \times dF2 \approx 1 : 0.5 : 0.25 \qquad (A)$$

By arranging index anisotropy and thickness of the liquid crystal layers and the first and second compensation layers in accordance with the equation (A), it is possible to prevent displayed images from being tinged with colors in certain viewing angles. In addition, it is also possible to prevent occurrence of light-loosening in oblique viewing angle, even when black color is to be displayed.

It is preferable that the product ΔnF2×dF2 is set smaller than a product which satisfies the equation (A), which ensures an enhanced effect for preventing chromaticity fluctuation.

It is preferable that the product ΔnF2×dF2 is set greater than a product which satisfies the equation (A), which ensures an enhanced effect for preventing light-loosening which would occur when black color is displayed.

There is still further provided an in-plane switching type liquid crystal display including (a) first and second polarizing plates facing each other and spaced away from each other, (b) a liquid crystal layer situated between the first and second polarizing plates, orientation azimuth of the liquid crystal layer being caused to vary by an electric field parallel to a substrate, and (c) a compensation layer composed of biaxial birefringence medium, and having greater principal indices of refraction perpendicular to a substrate than principal indices of refraction parallel with the substrate.

In accordance with the above-mentioned in-plane switching type liquid crystal display, the compensation layer doubles as the above-mentioned first and second compensation layer, and hence, can provide the same advantageous effects in a simpler structure as the effects obtained by previously mentioned in-plane switching type liquid crystal displays.

Though the above-mentioned Japanese Unexamined Patent Publication No. 9-80424 has suggested the concept that an increase or decrease of birefringence in a liquid crystal layer is compensated for by birefringence variation in a compensation layer when a viewing angle varies, the present invention ensures enhanced optical compensation effect by virtue of a character that an index of refraction associated with a principal optical axis in a thickness-wise direction of a compensation layer is designed greater than an index of refraction associated with other principal optical axes.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 20 illustrates how a liquid crystal layer varies by a voltage of director profile.

FIG. 22 is a graph showing a voltage-transmissivity characteristic varying in dependence on a viewing angle, in the in-plane switching type liquid crystal display in accordance with the example 2.

FIGS. 23A and 23B illustrate loci of chromaticity variation in the in-plane switching type liquid crystal display in accordance with the example 3.

FIG. 24 is a graph showing a voltage-transmissivity characteristic varying in dependence on a viewing angle, in the in-plane switching type liquid crystal display in accordance with the example 3.

FIG. 27 is an exploded perspective view of a liquid crystal display in accordance with the example 7.

DESCRIPTION OF THE PREFERRED EMBODIMENTS

[First Embodiment]

Figure 10:
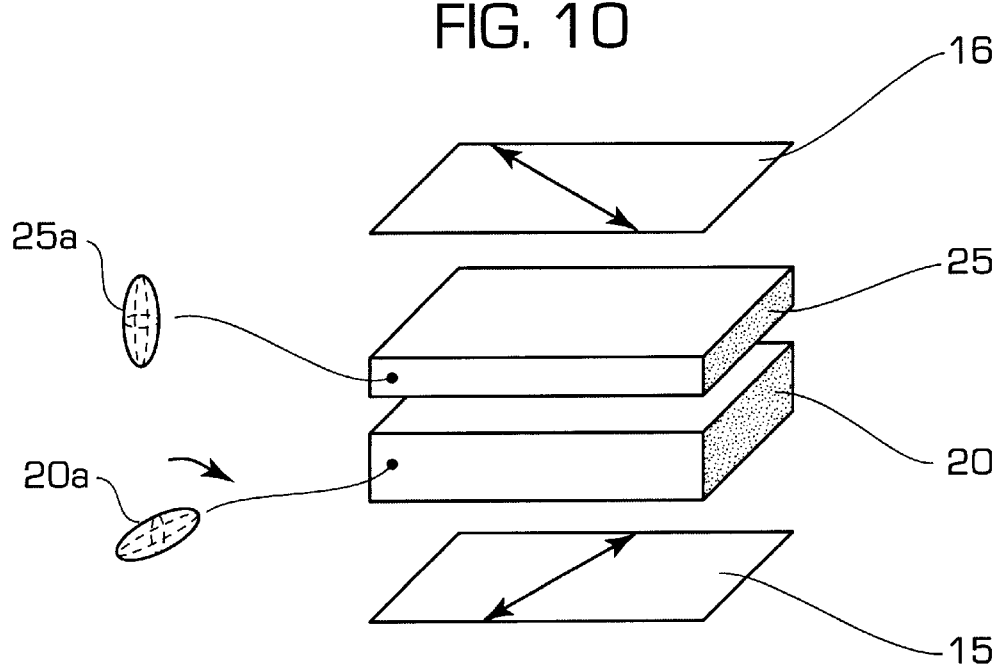
FIG. 10 is an exploded perspective view of an in-plane switching type liquid crystal display in accordance with the first embodiment of the invention.

FIG. 10 is an exploded perspective view illustrating a liquid crystal display in accordance with the first embodiment. The illustrated liquid crystal display includes first and second polarizing plates 15 and 16, a pair of substrates (not illustrated) sandwiched between the first and second polarizing plates 15 and 16, and corresponding to the glass substrates 11 and 12 illustrated in FIG. 1, a liquid crystal layer 20 sandwiched between the first and second polarizing plates 15 and 16, and a first compensation layer 25 sandwiched between the second polarizing plate 16 and the liquid crystal layer 20.

The liquid crystal layer 20 has index ellipsoid 20a, and the first compensation layer 25 has index ellipsoid 25a both as illustrated in FIG. 10.

Figure 1:
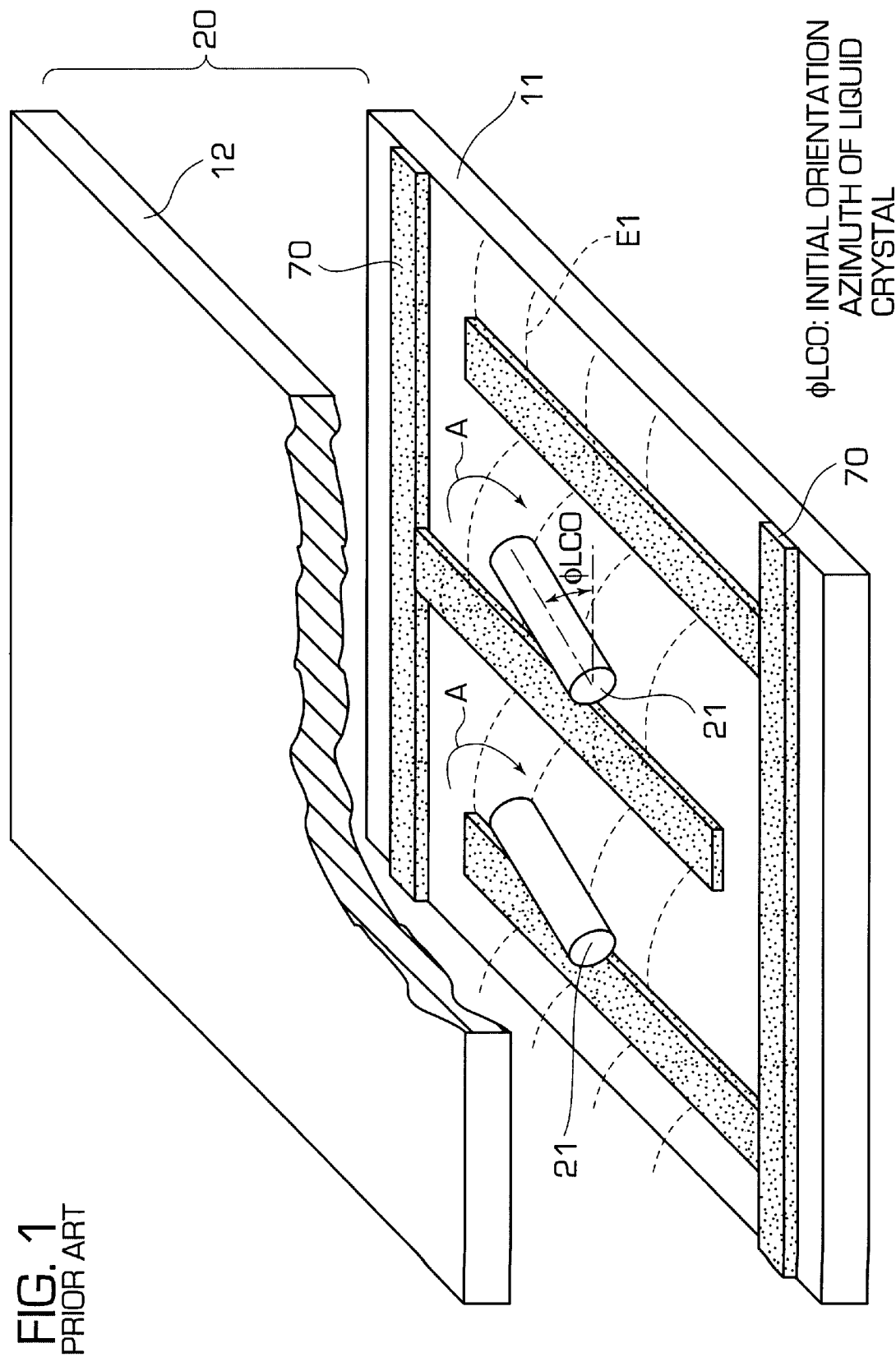
FIG. 1 is an exploded perspective view of a conventional in-plane switching type liquid crystal display.
Figure 2:
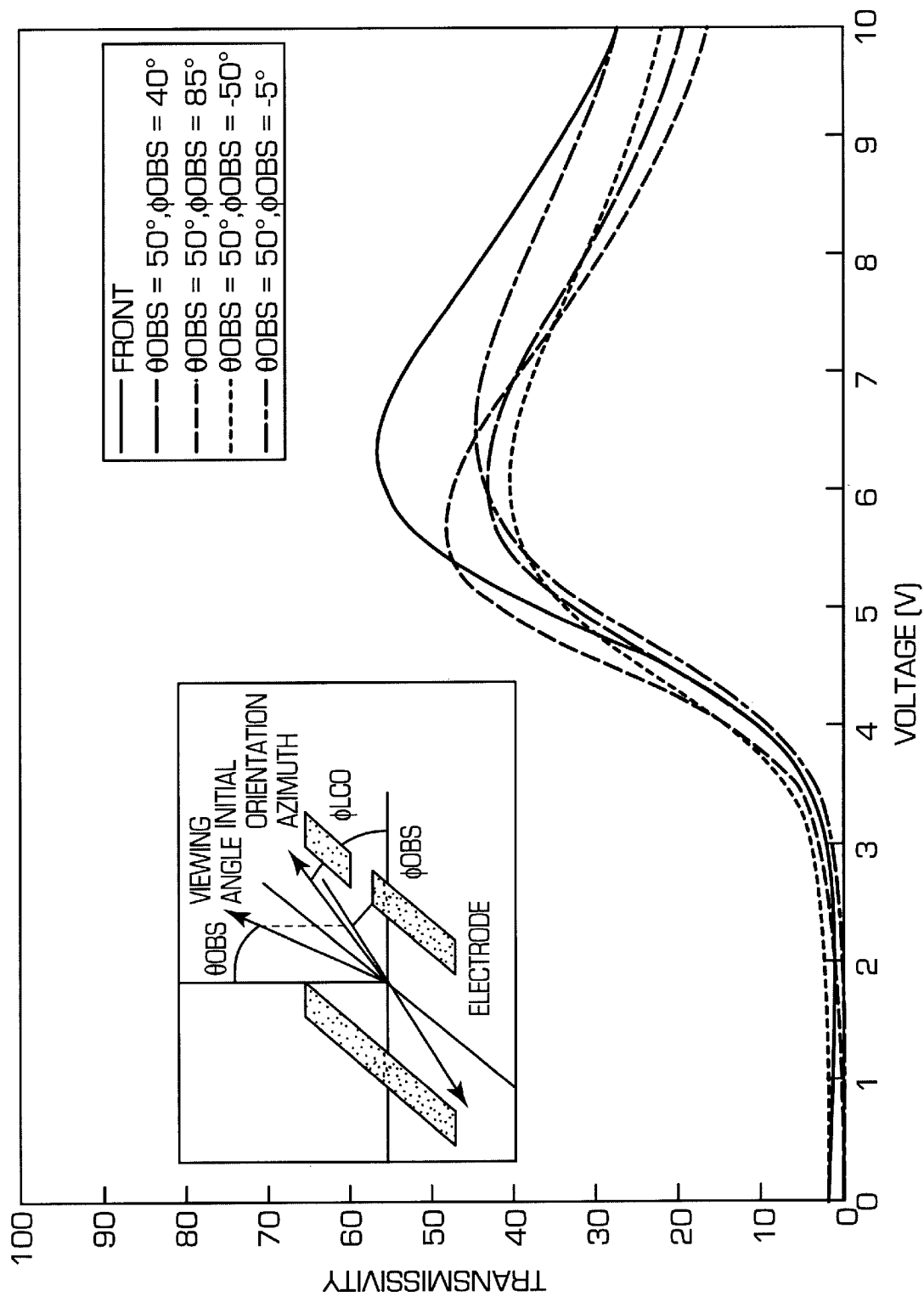
FIG. 2 is a graph showing a voltage-transmissivity characteristic varying in dependence on a viewing angle, in a conventional in-plane switching type liquid crystal display.
Figure 3:
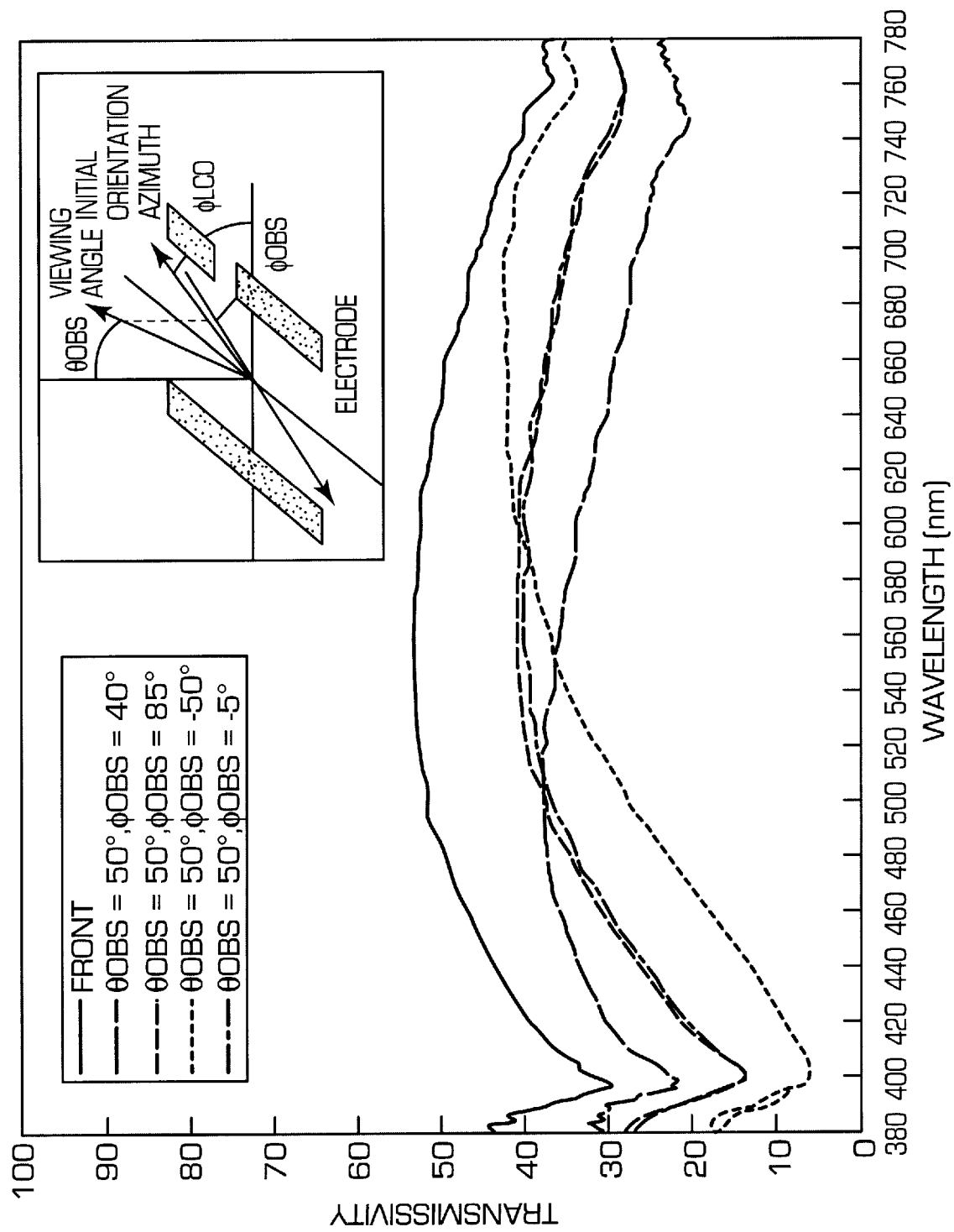
FIG. 3 is a graph showing spectrum of transmissive lights in bright state, varying in dependence on a viewing angle, in a conventional in-plane switching type liquid crystal display.

Though not illustrated, the lower substrate corresponding to the glass substrate 11 illustrated in FIG. 1 is formed at a surface thereof with electrodes having sinking combs extending in mesh with each other. Namely, the electrodes have the same structure as that of the comb electrodes 70 illustrated in FIG. 1 for generating a liquid crystal driving field.

The first compensation 25 may be positioned between the upper substrate and the second polarizing plate 16, between the lower substrate and the first polarizing plate 15, between the first polarizing plate 15 and the liquid crystal layer 20, or between the second polarizing plate 16 and the liquid crystal layer 20. The first compensation layer 25 may be comprised of a plurality of divisional layers, and positioned between the first and second polarizing plates 15 and 16. For instance, the first compensation layer 25 may be comprised of two divisional layers each positioned outside the liquid crystal layer 20.

In FIG. 10, the liquid crystal layer 20 is composed of nematic liquid crystal having positive index anisotropy Δn, and has orientation azimuth which is varied by an electric field parallel to the substrates. The liquid crystal layer 20 has dielectric constant anisotropy Δε which may be either positive or negative. However, initial orientation azimuth of the liquid crystal has to be arranged in accordance with a sign of the dielectric constant anisotropy Δε.

The first compensation layer 25 has positive uniaxial optical anisotropy, and further has an optical axis extending in a direction perpendicular to the substrates, namely, extending in a Z-axis direction. That is, the following relation is established.

$$nzF > nxF = nyF$$

In the first embodiment, a product ΔnF×dF of index anisotropy ΔnF (ΔnF=nzF−nxF, nyF) and a thickness dF of the first compensation layer 25 is designed to be equal to about a half of a product Δn×d of index anisotropy Δn and a thickness "d" of the liquid crystal layer 20.

In accordance with the liquid crystal display illustrated in FIG. 10, since variation in apparent birefringence of the liquid crystal layer 20, caused by variation in a viewing angle, is compensated for by variation in birefringence of the first compensation layer 25, it is possible to efficiently suppress displayed images from being tinged with colors.

[Second Embodiment]

Figure 11:
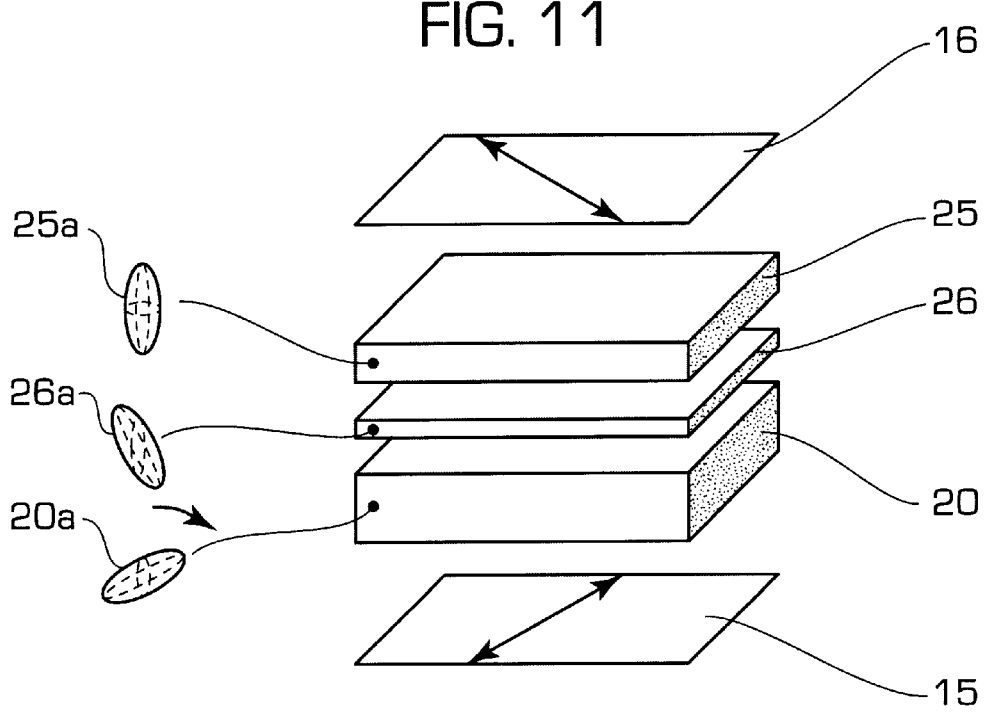
FIG. 11 is an exploded perspective view of an in-plane switching type liquid crystal display in accordance with the second embodiment of the invention.
Figure 12:
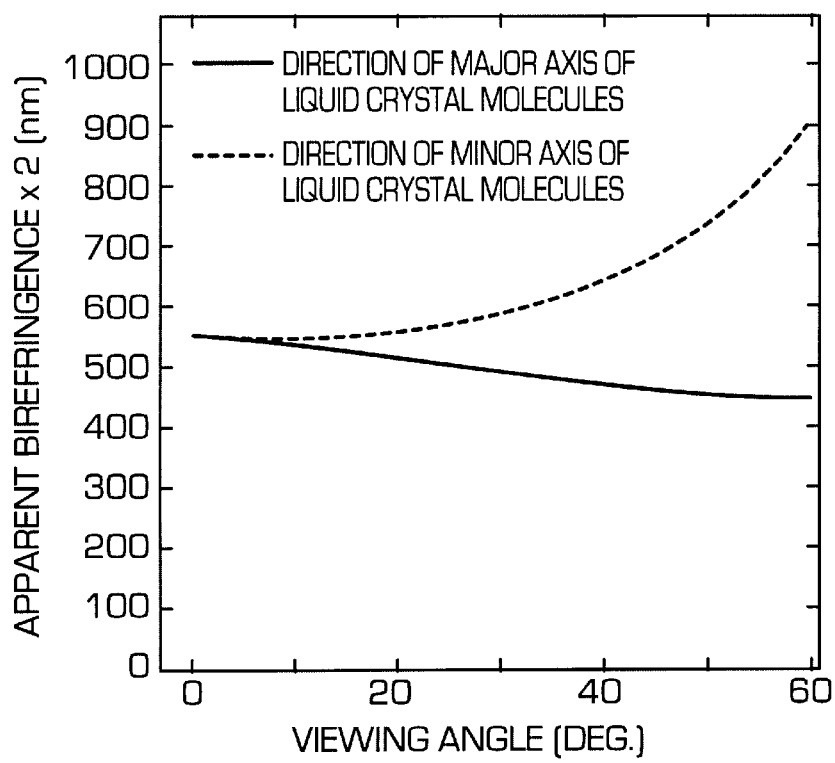
FIG. 12 is a graph showing how birefringence apparently varies in dependence on a viewing angle in the in-plane switching type liquid crystal display in accordance with the example 1.
Figure 13:
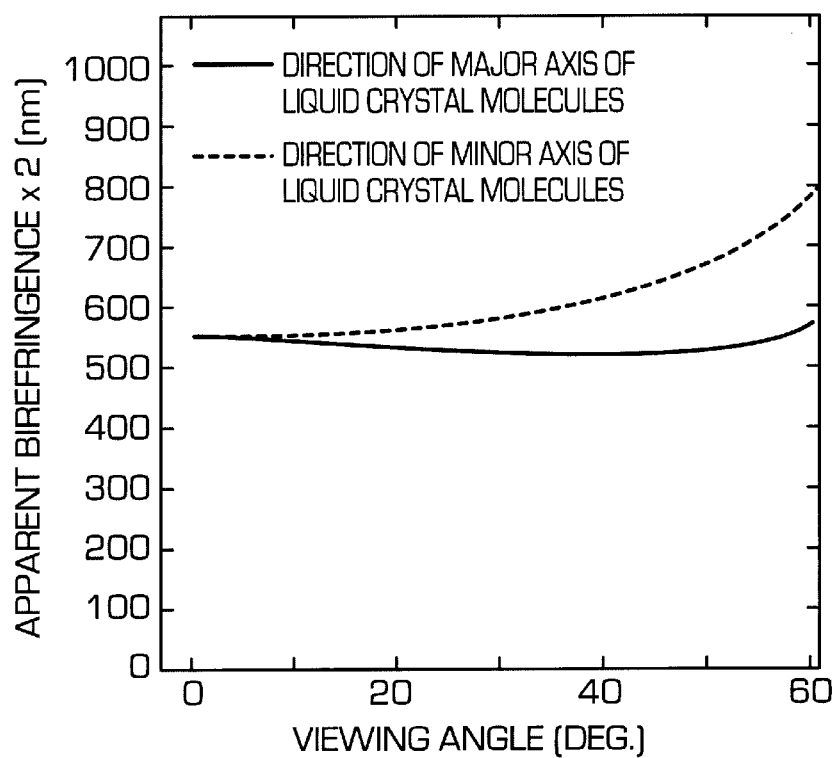
FIG. 13 is a graph showing how birefringence apparently varies in dependence on a viewing angle in the in-plane switching type liquid crystal display in accordance with the example 1.
Figure 14:
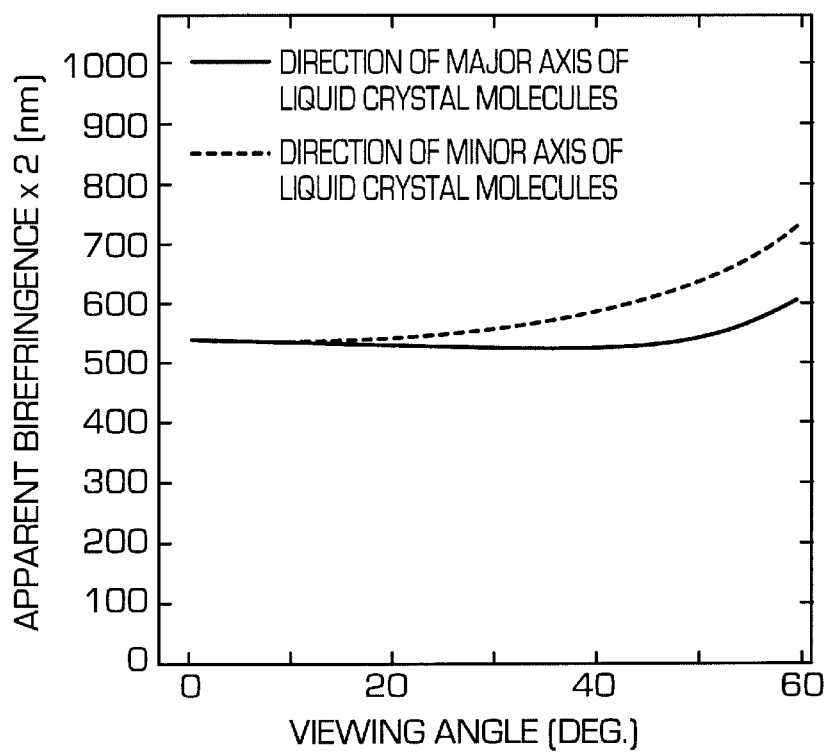
FIG. 14 is a graph showing how birefringence apparently varies in dependence on a viewing angle in the in-plane switching type liquid crystal display in accordance with the example 1.
Figure 15:
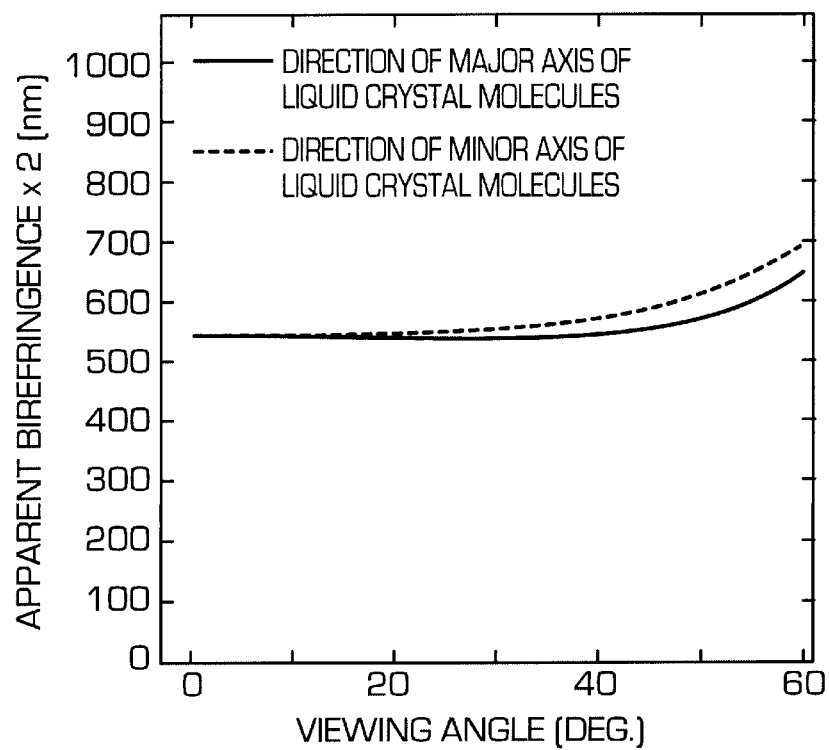
FIG. 15 is a graph showing how birefringence apparently varies in dependence on a viewing angle in the in-plane switching type liquid crystal display in accordance with the example 1.
Figure 16:
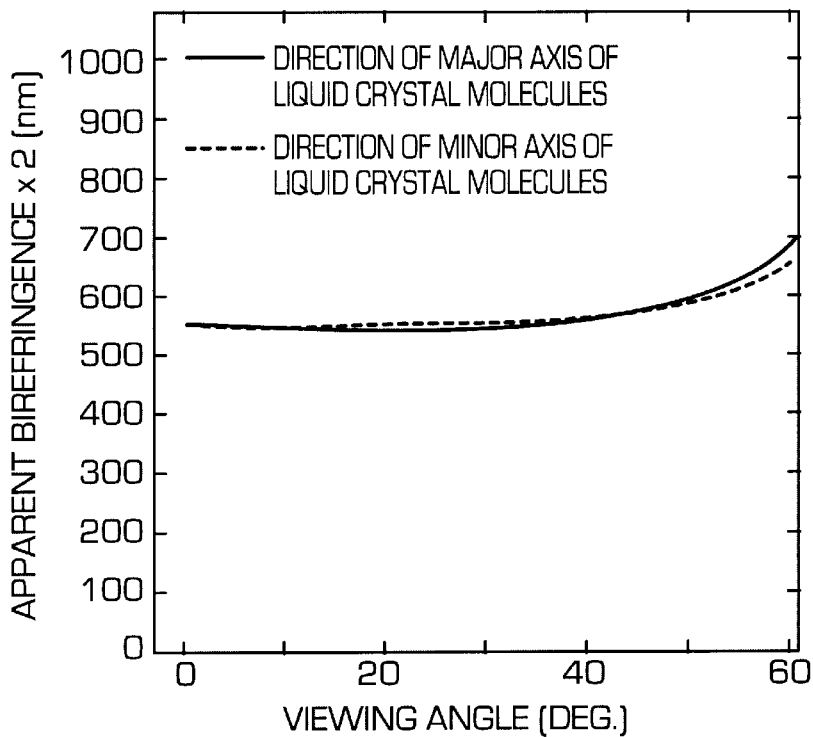
FIG. 16 is a graph showing how birefringence apparently varies in dependence on a viewing angle in the in-plane switching type liquid crystal display in accordance with the example 1.
Figure 17:
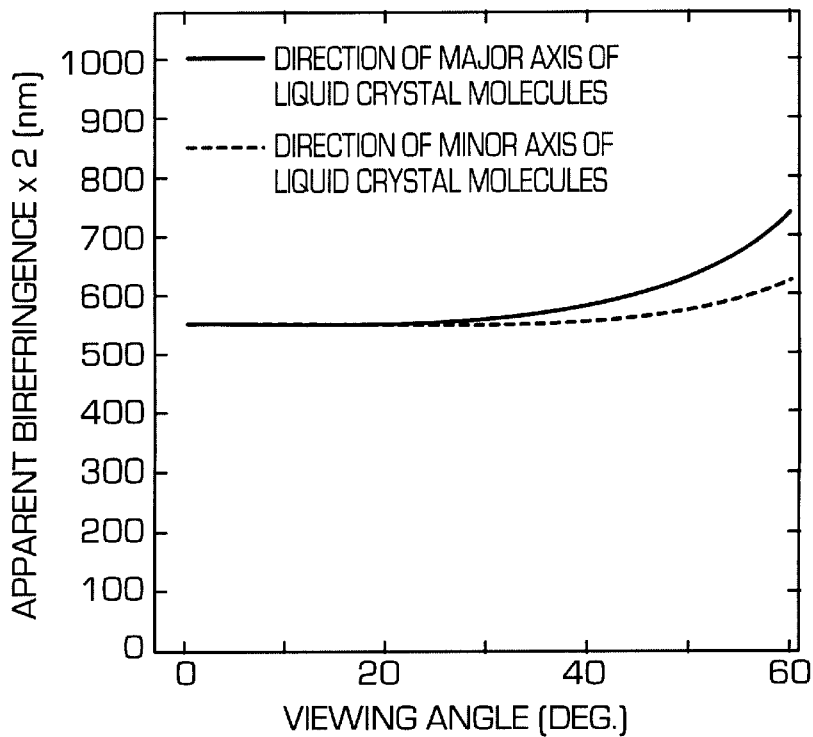
FIG. 17 is a graph showing how birefringence apparently varies in dependence on a viewing angle in the in-plane switching type liquid crystal display in accordance with the example 1.
Figure 18:
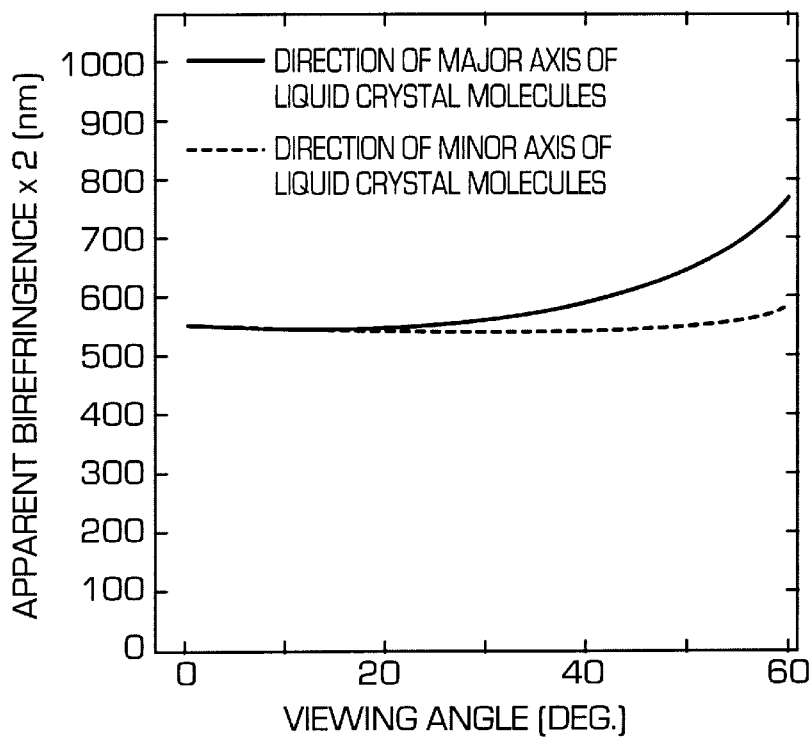
FIG. 18 is a graph showing how birefringence apparently varies in dependence on a viewing angle in the in-plane switching type liquid crystal display in accordance with the example 1.
Figure 19:
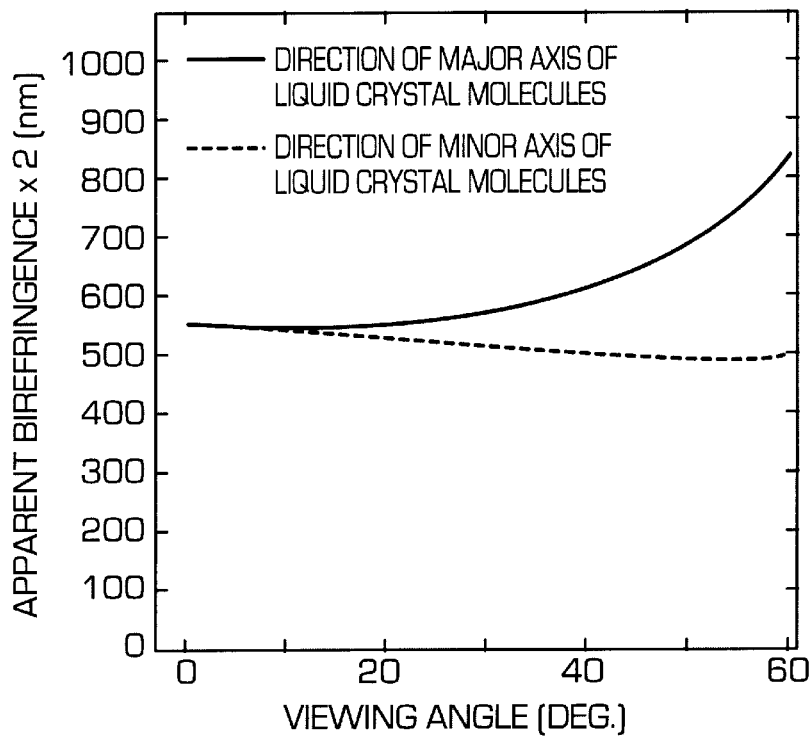
FIG. 19 is a graph showing how birefringence apparently varies in dependence on a viewing angle in the in-plane switching type liquid crystal display in accordance with the example 1.

FIG. 11 is an exploded perspective view illustrating a liquid crystal display in accordance with the second embodiment. The illustrated liquid crystal display includes first and second polarizing plates 15 and 16, a pair of substrates (not illustrated) sandwiched between the first and second polarizing plates 15 and 16, and corresponding to the glass substrates 11 and 12 illustrated in FIG. 1, a liquid crystal layer 20 sandwiched between the first and second polarizing plates 15 and 16, a first compensation layer 25 sandwiched between the second polarizing plate 16 and the liquid crystal layer 20, and a second compensation layer 26 sandwiched between the first compensation layer 25 and the liquid crystal layer 20.

That is, the liquid crystal display in accordance with the second embodiment is different from the first embodiment in additionally including another compensation layer, namely, the second compensation layer 26.

The liquid crystal layer 20 has index ellipsoid 20a, the first compensation layer 25 has index ellipsoid 25a, and the second compensation layer 26 has index ellipsoid 26a, as illustrated in FIG. 10.

Similarly to the first embodiment, the lower substrate corresponding to the glass substrate 11 illustrated in FIG. 1 is formed at a surface thereof with electrodes (not illustrated) having sinking combs extending in mesh with each other.

As mentioned earlier, the liquid crystal display in accordance with the first embodiment has an advantage that it is possible to prevent displayed images from being tinged with colors. However, in the liquid crystal display in accordance with the first embodiment, there may occur light-loosening in oblique viewing angles when black color is displayed, which is accompanied with reduction in contrast and inversion of gradation. The liquid crystal display in accordance with the second embodiment can have the same advantage as that of the first embodiment, and an additional advantage that the above-mentioned light-loosening which occurs when black color is displayed can be prevented.

The second compensation layer 26 has positive uniaxial optical anisotropy, and further has an optical axis extending in a direction parallel to the substrates. In addition, the optical axis of the second compensation layer 26 is designed to extend perpendicularly to the initial orientation azimuth of the liquid crystal layer 20.

In the second embodiment, a product ΔnF2×dF2 of index anisotropy ΔnF2 and a thickness dF2 of the second compensation layer 26 is designed to be equal to about a quarter of a product Δn×d of index anisotropy Δn and a thickness "d" of the liquid crystal layer 20.

The liquid crystal layer 20, the first compensation layer 25, and the second compensation layer 26 may be positioned in any order between the first and second polarizing plates 15 and 16. The second compensation layer 26 is sandwiched between the first compensation layer 25 and the liquid crystal layer 20 in the second embodiment, however, the second compensation layer 26 may be sandwiched between the second polarizing plate 16 and the first compensation layer 25, for instance.

Each of the first and second compensation layers 25 and 26 may be comprised of a plurality of divisional layers.

As an alternative, a single compensation layer composed of biaxial birefringence medium may be employed in place of the first and second compensation layers 25 and 26. This single compensation layer is designed to accomplish birefringence operation of both the first and second compensation layers 25 and 26.

Each one of the first and second compensation layers 25 and 26 may be composed of a single film, or of a plurality of stacked films. In addition, the first and second compensation layers 25 and 26 may be formed integrally with, or may be formed separately from the first and second polarizing plates 15 and 16.

The in-plane switching type liquid crystal display in accordance with the present invention is applicable to segment type, simple matrix type, or active matrix type one.

EXAMPLE 1

Figure 5A:
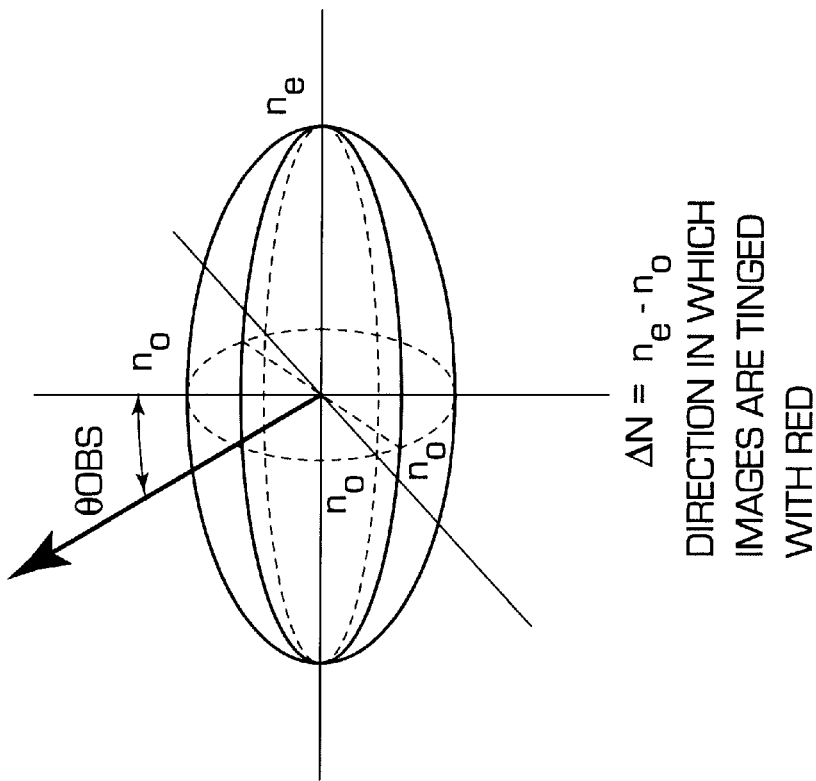
FIGS. 5A and 5B illustrate how index anisotropy varies in dependence on a viewing angle.
Figure 5B:
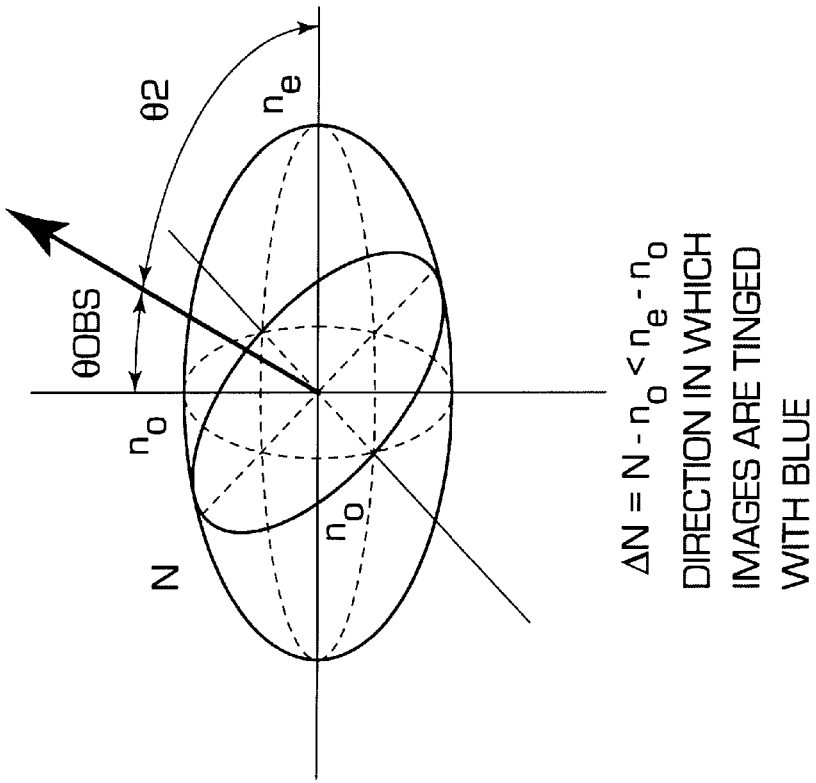
Figure 6:
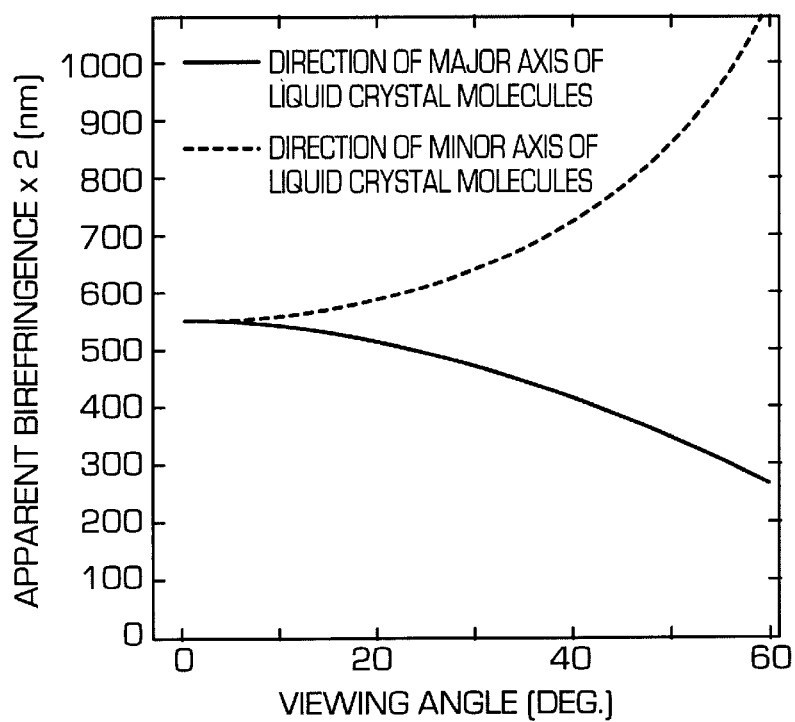
FIG. 6 is a graph showing how birefringence apparently varies in dependence on a viewing angle in a conventional in-plane switching type liquid crystal display.
Figure 7:
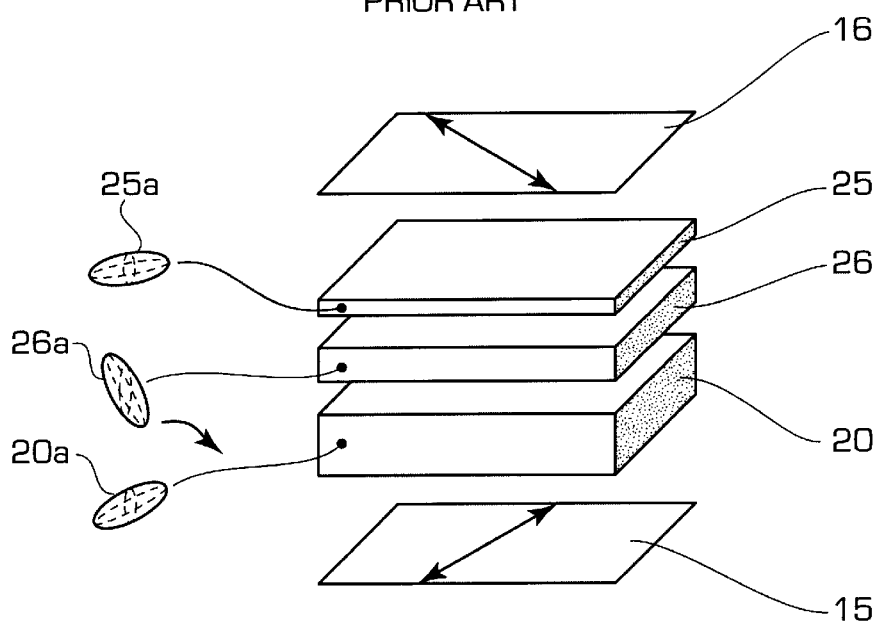
FIG. 7 is an exploded perspective view of another conventional in-plane switching type liquid crystal display.
Figure 8:
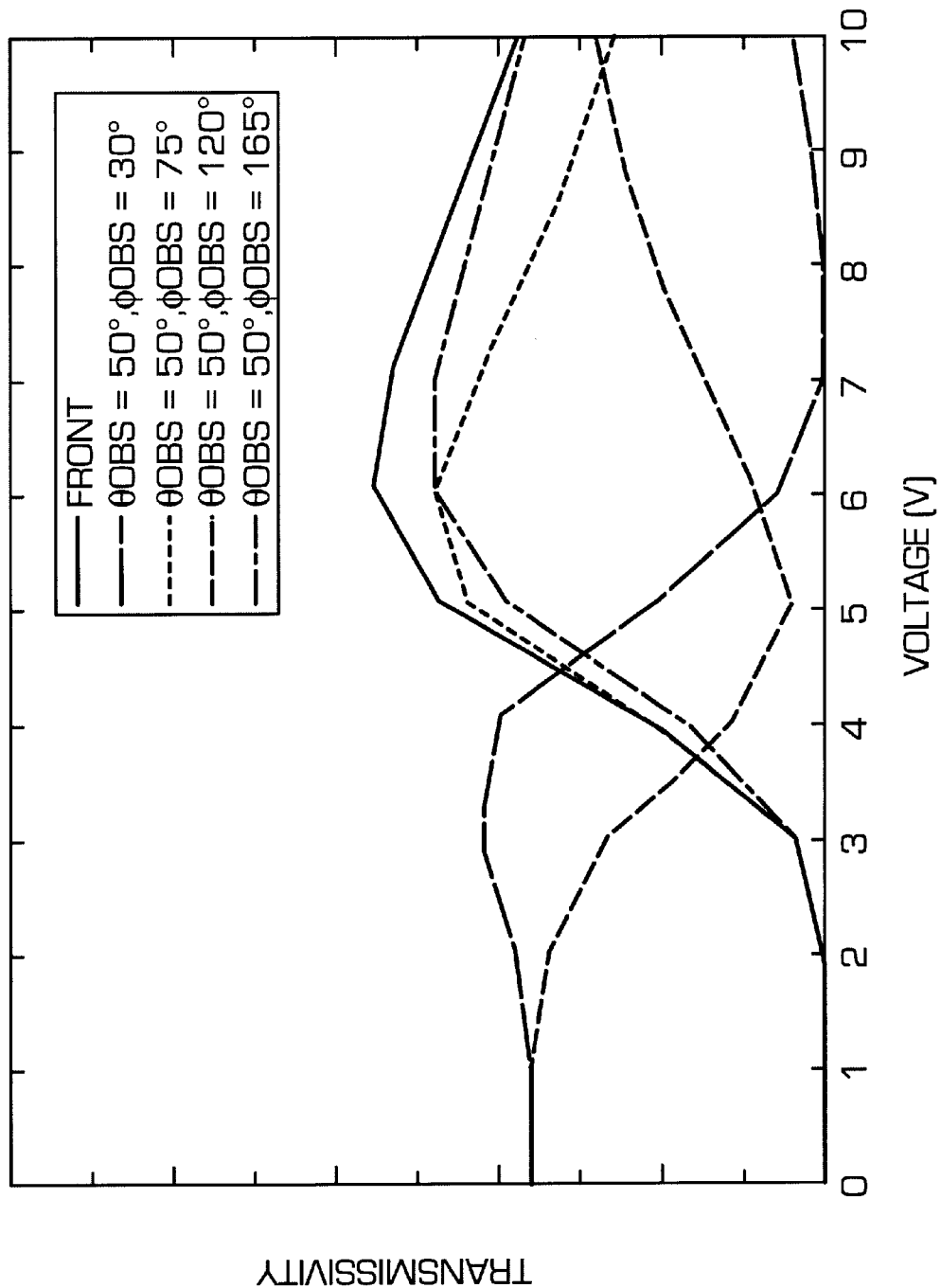
FIG. 8 is a graph showing a voltage-transmissivity characteristic varying in dependence on a viewing angle, in the conventional in-plane switching type liquid crystal display illustrated in FIG. 7.
Figure 9B:
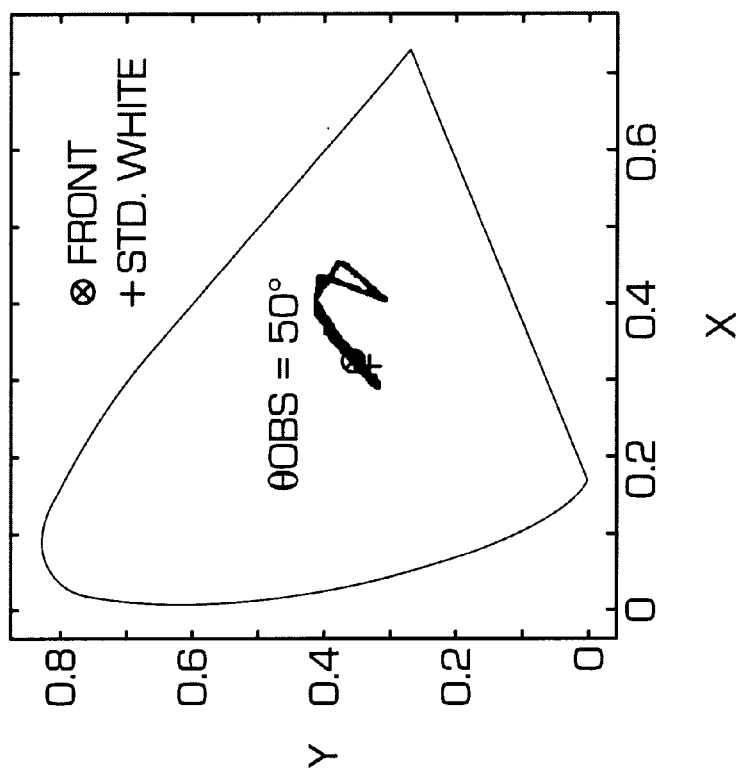
FIGS. 9A and 9B illustrate loci of chromaticity variation in the conventional in-plane switching type liquid crystal display illustrated in FIG. 25.
Figure 9A:
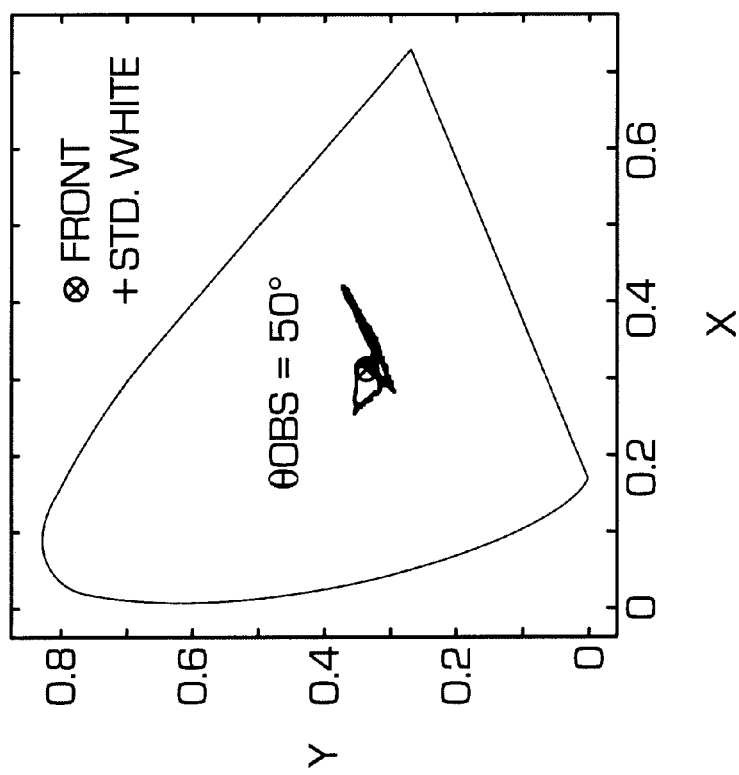

FIGS. 12 to 19 are similar to FIGS. 5A and 5B, and are graphs showing the calculation results of how birefringence apparently varies when a viewing angle is inclined to a major or minor axis of liquid crystal molecules in the in-plane switching type liquid crystal display in accordance with the first embodiment, illustrated in FIG. 10. FIGS. 12 to 19 show the calculation results obtained when a product $\Delta nF\ dF$ of index anisotropy $\Delta nF$ and a thickness dF of the first compensation layer 25 is 67 nm, 107 nm, 121 nm, 134 nm, 147 nm, 161 nm, 174 nm, and 201 nm, respectively. A product $\Delta n\ d$ of index anisotropy $\Delta n$ and a thickness "d" of the liquid crystal layer 20 is determined so that a product $\Delta n\ d \times 2$ is equal to 550 nm ($\Delta n\ d \times 2 = 550$ nm). These calculations were made on the assumption that liquid crystal in the liquid crystal layer 20 uniformly rotate between the upper and lower substrates.

Comparing FIGS. 12 to 19 with FIGS. 5A and 5B, it is understood that variation in apparent birefringence accompanied with variation in a viewing angle is well suppressed. It is also understood that when a product of $\Delta nF\ dF$ of the first compensation layer 25 is equal to about a half of the product of $\Delta n\ d$ of the liquid crystal layer 20, namely, is in the range of about 120 nm to about 160 nm, birefringence varies only slightly, which shows the first compensation layer 25 works properly. The reason for obtaining such an advantage is that birefringence of the first compensation layer 25 having positive index anisotropy and having optical anisotropic axis perpendicularly to the substrates is equal to zero at perpendicular incidence, but varies so as to cancel variation in birefringence of the liquid crystal layer 20, as an angle with which a light enters the liquid crystal display is increased.

EXAMPLE 2

Whereas how apparent birefringence varies in dependence on a viewing angle is explained in Example 1, an electro-optical characteristic of the in-plane switching type liquid crystal display illustrated in FIG. 10 is estimated by carrying out simulation in Example 2. In the simulation, a director profile, that is, a profile of liquid crystal orientation azimuth in a thickness-wise direction (that is, a Z-axis direction) was calculated on the assumption that an electric field has uniform strength in a direction parallel to substrates. Based on the director profile, an electro-optical characteristic of the liquid crystal layer 20 and the first compensation layer 25 both of which are stacked one on another was calculated.

FIG. 20 illustrates the director profile of the liquid crystal layer 20 used for the calculation of the electro-optical characteristic. Initial orientation azimuth of liquid crystal was set 75 degrees from a direction in which the electric field exists ($\phi=0$), and a cell thickness "d", that is, a thickness of the liquid crystal layer 20 was set 4.5 $\mu$m. The director profile was calculated for 0V, 3V, 4V, 5V, 6V, 7V, 8V, 9V, and 10V.

Based on the director profile calculated for each of voltages, illustrated in FIG. 20, an electro-optical characteristic of the stacked structure of the first compensation layer 25 and the liquid crystal layer 20 was then calculated. The index anisotropy $\Delta n$ of the liquid crystal layer 20 was equal to 0.067, and a product $\Delta n\ d$ of the index anisotropy $\Delta n$ and the thickness "d" of the liquid crystal layer 20 was equal to 302 nm. A product $\Delta nF\ dF$ of index anisotropy $\Delta nF$ and a thickness dF of the first compensation layer 25 was equal to 151 nm.

Figure 21B:
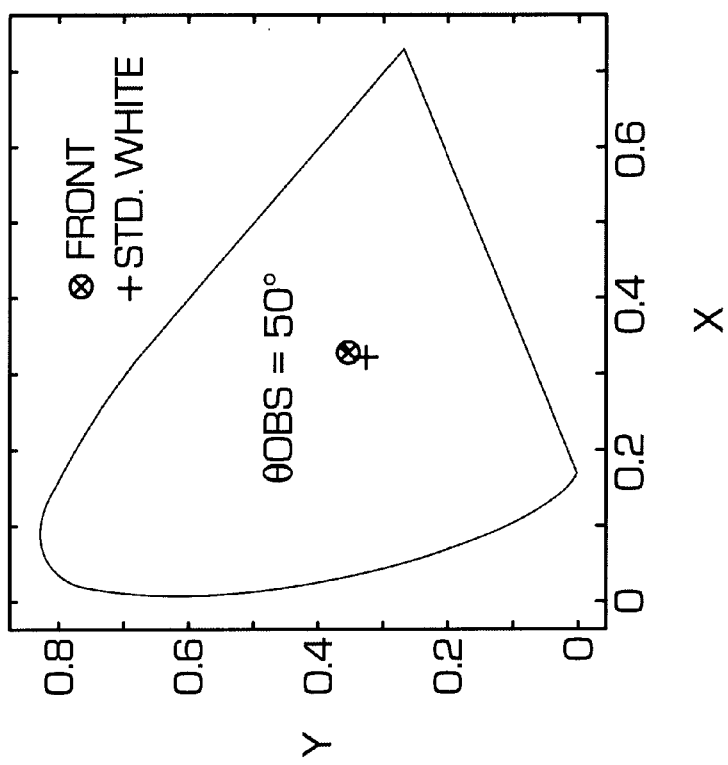
FIGS. 21A and 21B illustrate loci of chromaticity variation in the in-plane switching type liquid crystal display in accordance with the example 2.
Figure 21A:
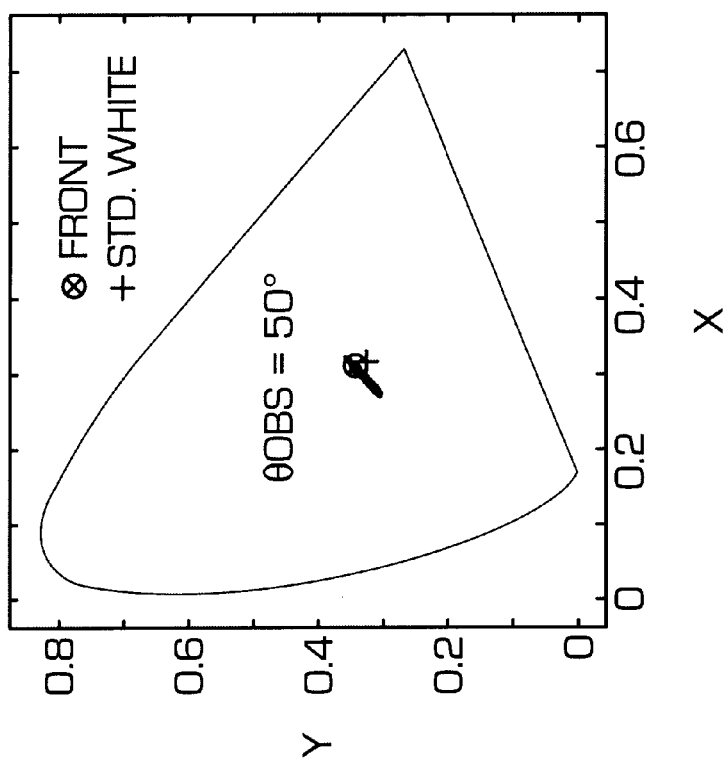

FIGS. 21A and 21B illustrate the simulation results of loci of chromaticity variation obtained when a polar angle of an observation direction is fixed at 50 degrees, and an azimuth angle of an observation direction is varied from 0 to 360 degrees in the liquid crystal display in accordance with Example 2. FIG. 21A illustrates the simulation results of varied chromaticity in a state intermediate between dark and bright states, and FIG. 21B illustrates the simulation results of varied chromaticity in bright state. FIG. 22 illustrates the calculation results of a voltage-transmissivity character obtained when an observation direction is varied in the liquid crystal display in accordance with Example 2.

Figure 4A:
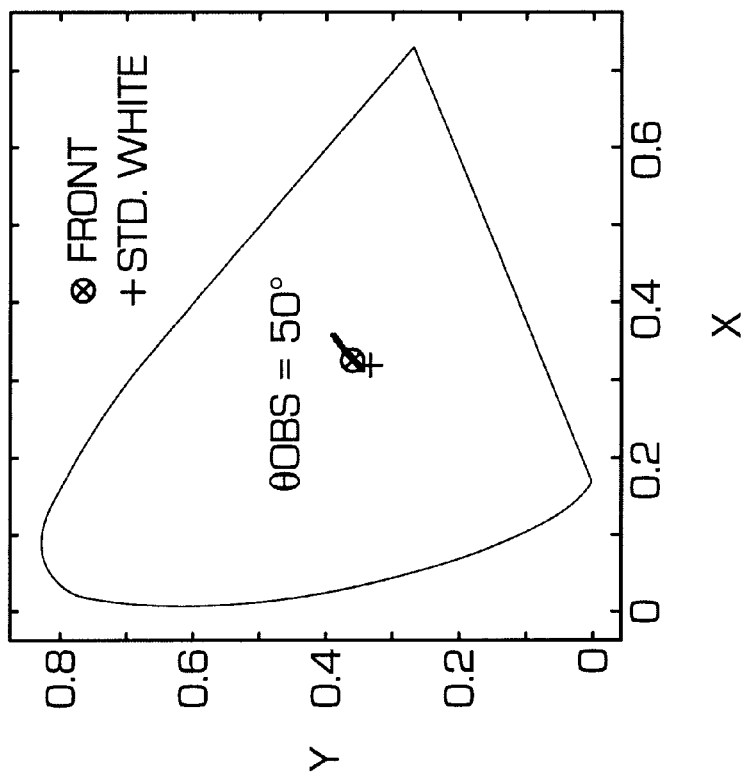
FIGS. 4A and 4B illustrate loci of chromaticity variation in a conventional in-plane switching type liquid crystal display.
Figure 4B:
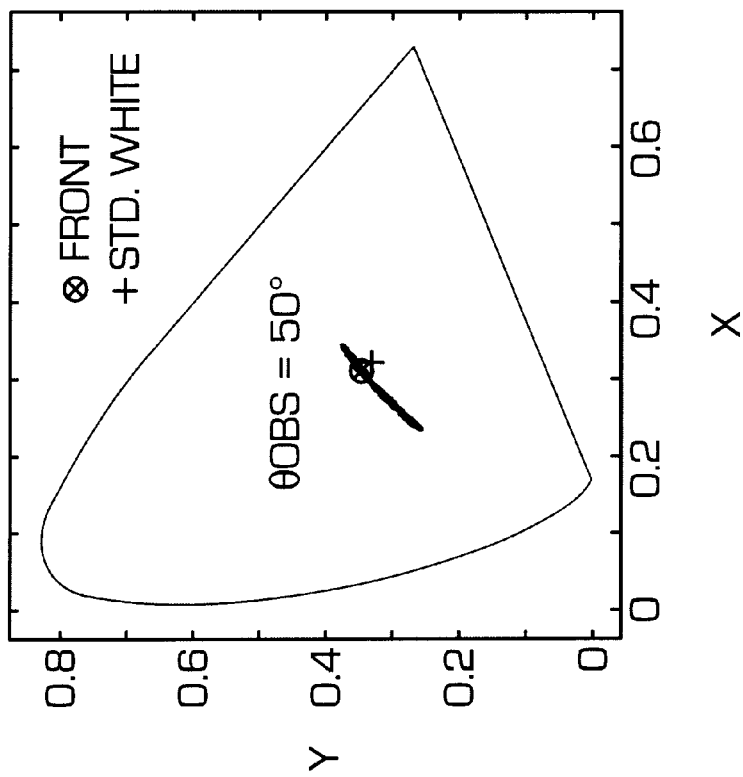

Comparing FIGS. 21A and 21B showing the simulation results of the liquid crystal display in accordance with Example 2 to FIGS. 4A and 4B showing the simulation results of the conventional liquid crystal display, chromaticity variation defined by the loci illustrated in FIGS. 21A and 21B is quite smaller than chromaticity variation defined by the loci illustrated in FIGS. 4A and 4B. This shows that the liquid crystal display in accordance with Example 2 can significantly suppresses displayed images from being tinged with colors, even if a viewing angle varies.

EXAMPLE 3

In Example 3, the liquid crystal display in accordance with the second embodiment, illustrated in FIG. 11, was estimated by carrying out simulation. The estimate was made in the same way as Example 2.

Index anisotropy $\Delta n$ of the liquid crystal layer 20 was equal to 0.067, and a product $\Delta n\ d$ of the index anisotropy $\Delta n$ and a thickness "d" of the liquid crystal layer 20 was equal to 302 nm. A product $\Delta nF\ dF$ of index anisotropy $\Delta nF$ and a thickness dF of the first compensation layer 25 was equal to 151 nm, and a product $\Delta nF2\ dF2$ of index anisotropy $\Delta nF2$ and a thickness dF2 of the second compensation layer 26 was equal to 67 nm.

FIGS. 23A and 23B illustrate the simulation results of loci of chromaticity variation obtained when a polar angle of an observation direction is fixed at 50 degrees, and an azimuth angle of an observation direction is varied from 0 to 360 degrees in the liquid crystal display in accordance with Example 3. FIG. 23A illustrates the simulation results of varied chromaticity in a state intermediate between dark and bright states, and FIG. 23B illustrates the simulation results of varied chromaticity in bright state. FIG. 24 illustrates the calculation results of a voltage-transmissivity character obtained when an observation direction is varied in the liquid crystal display in accordance with Example 2.

Comparing FIGS. 23A and 23B showing the simulation results of the liquid crystal display in accordance with Example 3 to FIGS. 4A and 4B showing the simulation results of the conventional liquid crystal display, chromaticity variation defined by the loci illustrated in FIGS. 23A and 23B is about a half of chromaticity variation defined by the loci illustrated in FIGS. 4A and 4B. This shows that the liquid crystal display in accordance with Example 3 can significantly suppresses displayed images from being tinged with colors, even if a viewing angle varies.

In addition, as illustrated in FIG. 24, there does not occur light-loosening even in oblique viewing angles when black color is displayed, in which case, an applied voltage is in the range of 0 to 2V. This advantage is brought by the second compensation layer 26. The advantage brought by the second compensation layer 26 can be obviously confirmed in particular when the angle θobs is equal to 50 degrees and the angle φobs is equal to 120 degrees, by comparing FIG. 24 to FIG. 22.

EXAMPLE 4

In Example 4, the same calculation as Example 3 was made with both the product ΔnF dF of the first compensation layer 25 and the product ΔnF2 dF2 of the second compensation layer 26 being varied in the range of 16.75 nm to 301.5 nm for every 16.75 nm. Comparing voltage-transmissivity characteristics to one another, and further loci of chromaticity variation to one another in all the calculation results, it has been confirmed that chromaticity variation is well suppressed in oblique viewing angles, and that there does not occur light-loosening when black color is displayed, when the product Δn d of the liquid crystal layer 20, the product ΔnF dF of the first compensation layer 25, and the product ΔnF2 dF2 of the second compensation layer 26 have a relation defined by the following equation.

$$\Delta n \times d : \Delta nF \times dF : \Delta nF2 \times dF2 \approx 1 : 0.5 : 0.25$$

If the product ΔnF2 dF2 of the second compensation layer 26 is set smaller than the product ΔnF2 dF2 which meets the above-identified equation, there can be obtained enhanced effect for suppressing chromaticity variation. On the contrary, if the product ΔnF2 dF2 of the second compensation layer 26 is set greater than the product ΔnF2 dF2 which meets the above-identified equation, there can be obtained enhanced effect for suppressing light-loosening when black color is displayed.

EXAMPLE 5

The liquid crystal display employed in Example 5 was a liquid crystal display having the same structure as that of the liquid crystal display in accordance with the second embodiment, illustrated in FIG. 11, except having a single compensation layer in place of the first compensation layer 25 and the second compensation layer 26. The liquid crystal display as mentioned above was estimated by carrying out simulation. The single compensation layer is composed of biaxial birefringence medium, and has the same function as the functions obtained by both the first and second compensation layers 25 and 26.

Index anisotropy Δn of the liquid crystal layer 20 was equal to 0.067, and a product Δn d of the index anisotropy Δn and a thickness "d" of the liquid crystal layer 20 was equal to 302 nm. The single compensation layer composed of biaxial birefringence medium has a principal index of refraction defined by nzF=1.51207, nsF=1.51140, and nfF=1.51073, and has a thickness of 100 μm. An optical axis associated with the principal index of refraction ns was arranged to be perpendicular to initial orientation azimuth of the liquid crystal layer 20.

Figure 25A:
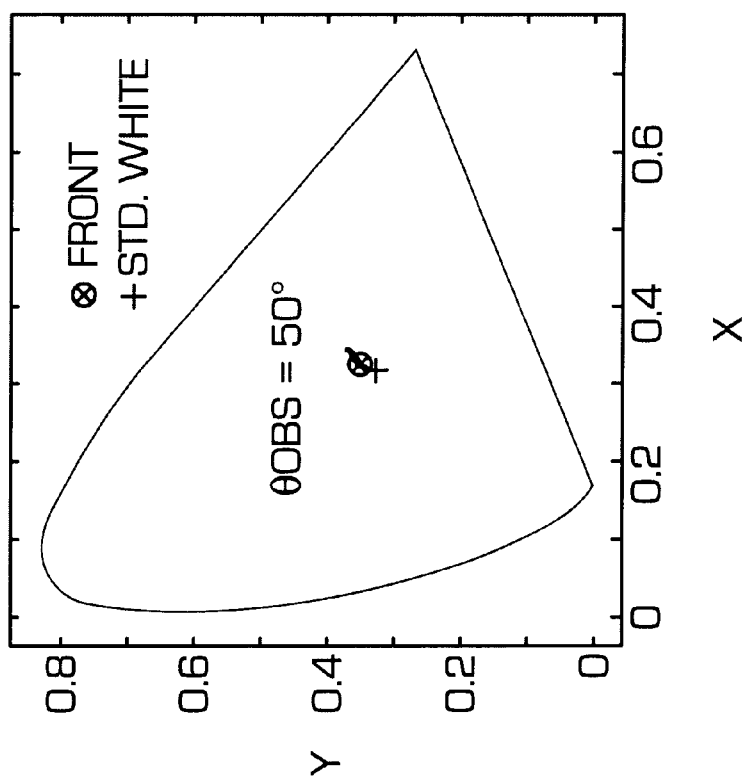
FIGS. 25A and 25B illustrate loci of chromaticity variation in the in-plane switching type liquid crystal display in accordance with the example 5.
Figure 25B:
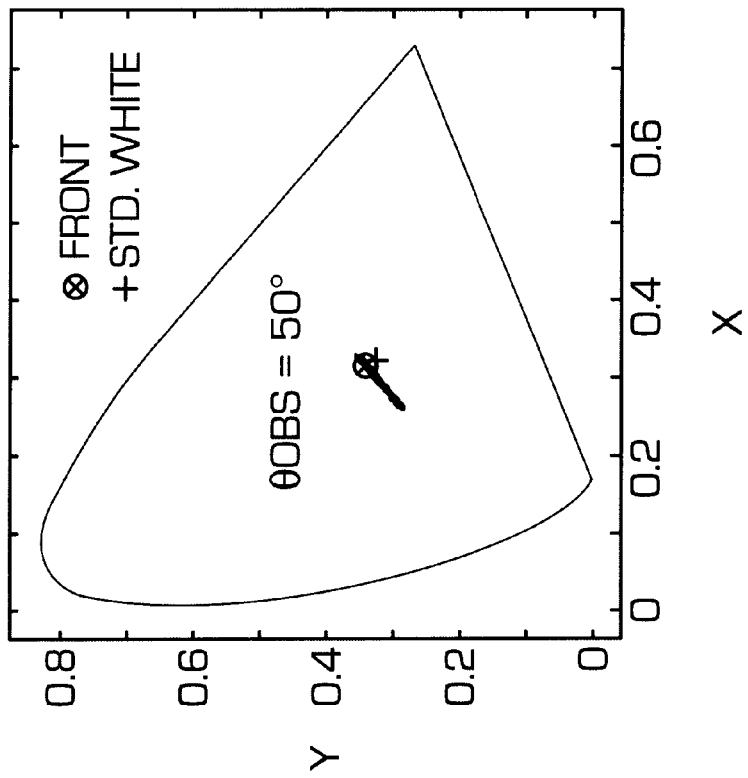
Figure 26:
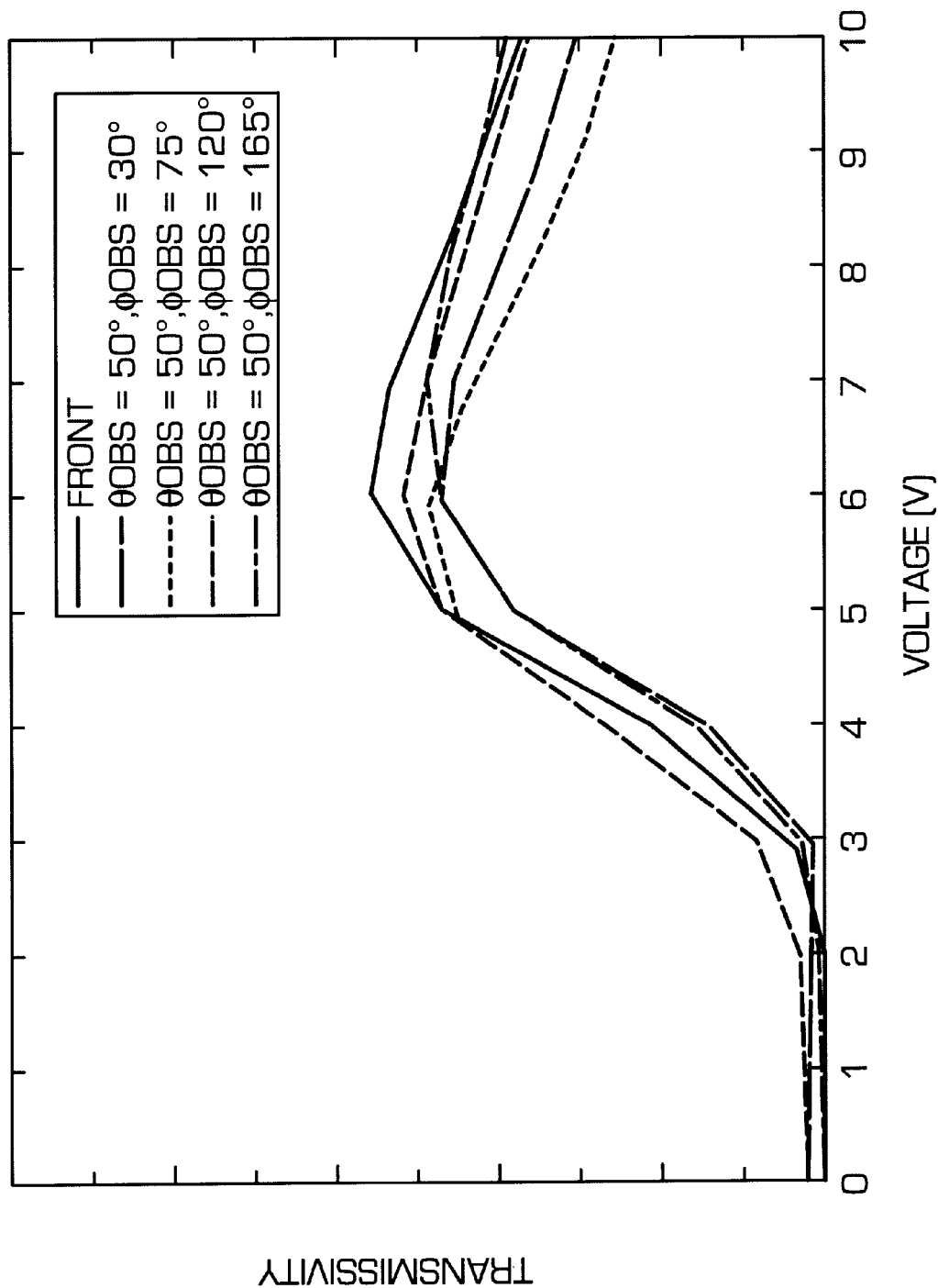
FIG. 26 is a graph showing a voltage-transmissivity characteristic varying in dependence on a viewing angle, in the in-plane switching type liquid crystal display in accordance with the example 5.

FIGS. 25A and 25B illustrate the simulation results of loci of chromaticity variation obtained when a polar angle of an observation direction is fixed at 50 degrees, and an azimuth angle of an observation direction is varied from 0 to 360 degrees in the liquid crystal display in accordance with Example 5. FIG. 25A illustrates the simulation results of varied chromaticity in a state intermediate between dark and bright states, and FIG. 25B illustrates the simulation results of varied chromaticity in bright state. FIG. 26 illustrates the calculation results of a voltage-transmissivity character obtained when an observation direction is varied in the liquid crystal display in accordance with Example 5.

In accordance with the liquid crystal display in Example 5, it is possible to suppress displayed images from being tinged with colors when a viewing angle varies, and in addition, there does not occur light-loosening when black color is displayed, in which case, an applied voltage is in the range of 0 to 2V.

EXAMPLE 6

The in-plane switching type liquid crystal display in Example 6 is comprised, similarly to the conventional in-plane switching type liquid crystal display illustrated in FIG. 1, of a pair of polarizing plates, a pair of glass substrates 11 and 12, a liquid crystal layer 20 sandwiched between the glass substrates 11 and 12, and a comb electrode 70 formed on the glass substrate 11. The comb electrode 70 has a plurality of sinking combs in mesh with each other.

Liquid crystal molecules 21 of the liquid crystal layer 20 has initial orientation azimuth φLC0 of 75 degrees, and the polarizing plates positioned outside the glass substrates 11 and 12 include transmission axes having azimuth φP and φA of 75 degrees and −15 degrees, respectively. Index anisotropy Δn of the liquid crystal layer 20 was equal to 0.067, and a product Δn d of index anisotropy Δn and a thickness "d" of the liquid crystal layer 20 was equal to 302 nm. The sinking combs of the comb electrode 70 had a width of 3 μm, and were spaced away from each other by 10 μm.

The liquid crystal display in Example 6 further includes a single compensation layer. This single compensation layer has the same characteristic as that of the compensation layer used in Example 5. Specifically, the single compensation layer is composed of biaxial birefringence, has a principal index of refraction defined by nzF=1.51207, nsF=1.51140, and nfF=1.51073, and has a thickness of 100 μm. The compensation layer was positioned between the upper substrate 12 and the polarizing plate located outside the upper substrate 12 so that an optical axis associated with the principal index of refraction ns had an azimuth angle of −15 degrees.

In accordance with the in-plane switching type liquid crystal display in Example 6, there does not occur light-loosening in oblique viewing angles even when black color is displayed, and displayed images are prevented from being tinged with colors when white color is displayed.

EXAMPLE 7

In Example 7, the present invention is applied to an active matrix type liquid crystal display. FIG. 27 illustrates the active matrix type liquid crystal display in Example 7.

The illustrated active matrix type liquid crystal display includes first and second polarizing plates 15 and 16, first and second substrates 11 and 12 both sandwiched between the first and second polarizing plates 15 and 16, a liquid crystal layer 20 sandwiched between the first and second substrates 11 and 12, a first compensation layer 25 sandwiched between the second polarizing plate 16 and the second substrate 12.

The first substrate 11 is an active matrix substrate formed on an upper surface with a thin film transistor 54, a gate bus line 55, a drain bus line 56, and a common bus line 75. A pixel electrode connected to a drain electrode of the thin film transistor 54 and a common electrode connected to the common bus line 75 cooperate with each other to thereby form an electrode pair having sinking combs in mesh with each other, in an associated region in each of pixels.

The second substrate 12 is a color filter substrate formed at a lower surface thereof with red (R), green (G), and blue (B) color layers, and further with black matrix for not allowing lights to pass therethrough.

The first and second polarizing plates 15 and 16, the liquid crystal layer 20, and the first compensation layer 25 have the same specification as those of Example 6.

In accordance with the liquid crystal display in Example 7, it was possible to prevent occurrence of gradation inversion in a wide range of viewing angles, and prevent displayed images from being tinged with colors.

While the present invention has been described in connection with the preferred embodiments, the present invention provides an advantage that a variation in birefringence of the compensation layer cancels a variation in birefringence of the liquid crystal layer, and hence, displayed images are less tinged with colors, even when a viewing angle varies.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-292856 filed on Oct. 24, 1997 including specification, claims, drawings and summary is incorporated herein by reference in its entirety.

What is claimed is:

1. An in-plane switching type liquid crystal display comprising:
    (a) first and second polarizing plates facing each other and spaced away from each other;
    (b) a liquid crystal layer situated between said first and second polarizing plates, orientation azimuth of said liquid crystal layer being caused to vary by an electric field parallel to a substrate; and
    (c) a first compensation layer situated between said first and second polarizing plates, said first compensation layer having positive uniaxial, optical anisotropy, and having the greatest index of refraction associated with an optical axis extending perpendicularly to said substrate, said first compensation layer varying birefringence thereof to thereby compensate for fluctuation in birefringence of said liquid crystal layer, caused by variation of a viewing angle.

2. The in-plane switching type liquid crystal display as set forth in claim 1, wherein a product $\Delta nF1 \times dF1$ of index anisotropy $\Delta nF1$ ($\Delta nF1 = nzF1 - nxF1, nyF1$) and a thickness $dF1$ of said first compensation layer is equal to about a half of a product $\Delta n \times d$ of index anisotropy $\Delta n$ and a thickness $d$ of said liquid crystal layer.

3. The in-plane switching type liquid crystal display as set forth in claim 1, wherein said first compensation layer is comprised of two divisional layers such that
    both of said two divisional layers are positioned at either side of said liquid crystal layer,
    or one of said two divisional layers is positioned on one side of said liquid crystal layer and the other of said two divisional layers is positioned on the other side of said liquid crystal layer.

4. The in-plane switching type liquid crystal display as set forth in claim 1, wherein said first compensation layer is composed of a single film.

5. The in-plane switching type liquid crystal display as set forth in claim 1, wherein said first compensation layer is composed of a plurality of stacked films.

6. The in-plane switching type liquid crystal display as set forth in claim 1, wherein said first compensation layer is formed integral with one of said first and second polarizing plates.

7. An in-plane switching type liquid crystal display comprising:
    (a) first and second polarizing plates facing each other and spaced away from each other;
    (b) a liquid crystal layer situated between said first and second polarizing plates, orientation azimuth of said liquid crystal layer being caused to vary by an electric field parallel to a substrate;
    (c) a first compensation layer situated between said first and second polarizing plates, said first compensation layer having positive uniaxial, optical anisotropy, and having the greatest index of refraction associated with an optical axis extending perpendicularly to said substrate, said first compensation layer varying birefringence thereof to thereby compensate for fluctuation in birefringence of said liquid crystal layer, caused by variation of a viewing angle; and
    (d) a second compensation layer situated between said first and second polarizing plates, said second compensation layer having positive uniaxial, optical anisotropy, and having an optical axis extending in parallel with said substrate and perpendicularly to initial orientation of said liquid crystal layer.

8. The in-plane switching type liquid crystal display as set forth in claim 7, wherein a product $\Delta nF2 \times dF2$ of index anisotropy $\Delta nF2$ ($\Delta nF2 = nzF2 - nxF2, nyF2$) and a thickness $dF2$ of said second compensation layer is equal to about a quarter of a product $\Delta n \times d$ of index anisotropy $\Delta n$ and a thickness $d$ of said liquid crystal layer.

9. The in-plane switching type liquid crystal display as set forth in claim 7, wherein said first and second compensation layers are positioned adjacent to each other.

10. The in-plane switching type liquid crystal display as set forth in claim 7, wherein said second compensation layer is comprised of a plurality of divisional layers each of said divisional layers being situated between said first and second polarizing plates.

11. The in-plane switching type liquid crystal display as set forth in claim 7, wherein a product $\Delta nF1 \times dF1$ of index anisotropy $\Delta nF1$ ($\Delta nF1 = nzF1 - nxF1, nyF1$) and a thickness $dF1$ of said first compensation layer is equal to about a half of a product $\Delta n \times d$ of index anisotropy $\Delta n$ and a thickness $d$ of said liquid crystal layer.

12. The in-plane switching type liquid crystal display as set forth in claim 7, wherein said first compensation layer is comprised of two divisional layers such that both of said two divisional layers are positioned at either side of said liquid crystal layer, or one of said two divisional layers is positioned on one side of said liquid crystal layer and the other of said two divisional layers is positioned on the other side of said liquid crystal layer.

13. The in-plane switching type liquid crystal display as set forth in claim 7, wherein at least one of said first and second compensation layers is composed of a single film.

14. The in-plane switching type liquid crystal display as set forth in claim 7, wherein at least one of said first and second compensation layers is composed of a plurality of stacked films.

15. The in-plane switching type liquid crystal display as set forth in claim 7, wherein at least one of said first and second compensation layers is formed integral with one of said first and second polarizing plates.

16. The in-plane switching type liquid crystal display as set forth in claim 7, wherein a product $\Delta n \times d$ of index anisotropy $\Delta n$ and a thickness d of said liquid crystal layer, a product $\Delta nF1 \times dF1$ of index anisotropy $\Delta nF1$ and a thickness $dF1$ of said first compensation layer, and a product $\Delta nF2 \times dF2$ of index anisotropy $\Delta nF2$ and a thickness $dF2$ of said second compensation layer are determined so as to satisfy the following equation (A).

$$\Delta n \times d : \Delta nF1 \times dF1 : \Delta nF2 \times dF2 \approx 1 : 0.5 : 0.25 \tag{A}$$

17. The in-plane switching type liquid crystal display as set forth in claim 16, wherein said product $\Delta nF2 \times dF2$ is set smaller than a product which satisfies said equation (A).

18. The in-plane switching type liquid crystal display as set forth in claim 16, wherein said product $\Delta nF2 \times dF2$ is set greater than a product which satisfies said equation (A).

19. An in-plane switching type liquid crystal display comprising:

(a) first and second polarizing plates facing each other and spaced away from each other;

(b) a liquid crystal layer situated between said first and second polarizing plates, orientation azimuth of said liquid crystal layer being caused to vary by an electric field parallel to a substrate; and (c) a compensation layer composed of biaxial birefringence medium, and having the greatest principal indices of refraction perpendicular to said substrate.

* * * * *